US012142824B2

(12) United States Patent
Rodríguez et al.

(10) Patent No.: US 12,142,824 B2
(45) Date of Patent: Nov. 12, 2024

(54) RECONFIGURABLE ANTENNA SYSTEMS INTEGRATED WITH METAL CASE

(71) Applicant: Skyworks Solutions, Inc., Irvine, CA (US)

(72) Inventors: René Rodríguez, Rancho Santa Margarita, CA (US); Stephen Joseph Kovacic, Newport Beach, CA (US)

(73) Assignee: Skyworks Solutions, Inc., Irvine, CA (US)

(*) Notice: Subject to any disclaimer, the term of this patent is extended or adjusted under 35 U.S.C. 154(b) by 0 days.

(21) Appl. No.: 18/344,101

(22) Filed: Jun. 29, 2023

(65) Prior Publication Data

US 2023/0344117 A1 Oct. 26, 2023

Related U.S. Application Data

(63) Continuation of application No. 17/448,818, filed on Sep. 24, 2021, now Pat. No. 11,735,815, which is a (Continued)

(51) Int. Cl.
*H01Q 1/40* (2006.01)
*H01Q 1/24* (2006.01)
(Continued)

(52) U.S. Cl.
CPC ............ *H01Q 1/405* (2013.01); *H01Q 1/243* (2013.01); *H01Q 1/38* (2013.01); *H01Q 9/0442* (2013.01)

(58) Field of Classification Search
CPC ........... H01Q 1/40; H01Q 1/405; H01Q 1/24; H01Q 1/243; H01Q 9/0402; H01Q 9/0407; H01Q 5/385; H01Q 21/065
See application file for complete search history.

(56) References Cited

U.S. PATENT DOCUMENTS

| | | | |
|---|---|---|---|
| 5,231,410 | A | 7/1993 | Murakami et al. |
| 5,673,053 | A | 9/1997 | Marthinsson |

(Continued)

FOREIGN PATENT DOCUMENTS

| | | |
|---|---|---|
| JP | S62-064014 | 4/1987 |
| JP | 2005-322972 | 11/2005 |

(Continued)

OTHER PUBLICATIONS

Suzuki et al., "An Integrated Configuration of Antennas and Filters for Front-End Module in Massive-MIMO Transmitter" IEEE International Symposium on Radio-Frequency Integration Technology 2015, 3 pages.

(Continued)

*Primary Examiner* — Hoang V Nguyen
(74) *Attorney, Agent, or Firm* — Knobbe, Martens, Olson & Bear, LLP

(57) ABSTRACT

Reconfigurable antenna systems integrated with a metal case are provided herein. In certain embodiments, user equipment (UE) for a cellular network includes a metal case and an antenna system for transmitting and/or receiving wireless signals. The antenna system includes a tuning conductor formed in the metal case, a patch antenna element that is spaced apart from the tuning conductor, and a switch electrically connected in series between the tuning conductor and a ground voltage. The switch electrically connects the tuning conductor to the ground voltage in an on state and electrically disconnects the tuning conductor from the ground voltage in an off state.

20 Claims, 20 Drawing Sheets

Related U.S. Application Data continuation of application No. 16/861,581, filed on Apr. 29, 2020, now Pat. No. 11,158,938.

(60) Provisional application No. 62/841,668, filed on May 1, 2019.

(51) Int. Cl.
*H01Q 1/38* (2006.01)
*H01Q 9/04* (2006.01)

(56) References Cited

U.S. PATENT DOCUMENTS

| | | | |
|---|---|---|---|
| 5,966,097 | A | 10/1999 | Fukasawa et al. |
| 6,061,025 | A | 5/2000 | Jackson et al. |
| 6,501,427 | B1 | 12/2002 | Lilly et al. |
| 6,828,938 | B2 | 12/2004 | Tran |
| 6,844,852 | B1 | 1/2005 | Simons |
| 7,068,234 | B2 | 6/2006 | Sievenpiper |
| 7,260,424 | B2 | 8/2007 | Schmidt |
| 7,265,724 | B1 | 9/2007 | Tan et al. |
| 7,372,406 | B2 | 5/2008 | Shiotsu et al. |
| 7,477,201 | B1 | 1/2009 | Bit-Babik et al. |
| 7,868,829 | B1 | 1/2011 | Colburn et al. |
| 7,952,533 | B2 | 5/2011 | Hur et al. |
| 8,369,796 | B2 | 2/2013 | Pan et al. |
| 8,380,132 | B2 | 2/2013 | Nagy |
| 8,654,034 | B2 | 2/2014 | Legare |
| 8,659,480 | B2 | 2/2014 | Wilkins |
| 8,967,485 | B2 | 3/2015 | Piazza et al. |
| 9,002,431 | B2 | 4/2015 | Jones |
| 9,077,082 | B2 | 7/2015 | Tatarnikov et al. |
| 9,203,144 | B2 | 12/2015 | De Luis et al. |
| 9,236,955 | B2 | 1/2016 | Bahl et al. |
| 9,379,449 | B2 | 6/2016 | Cetiner et al. |
| 9,537,201 | B2 | 1/2017 | Alexopoulos et al. |
| 9,711,849 | B1 | 7/2017 | Chen et al. |
| 9,793,597 | B2 | 10/2017 | Shamblin et al. |
| 9,859,617 | B1 | 1/2018 | Desclos et al. |
| 9,941,584 | B2 | 4/2018 | Kona et al. |
| 9,941,593 | B2 | 4/2018 | Ozdemir |
| 10,038,240 | B2 | 7/2018 | Patron et al. |
| 10,439,288 | B2 | 10/2019 | Rodríguez |
| 10,892,555 | B2 | 1/2021 | Rodríguez |
| 10,965,035 | B2 | 3/2021 | Rodríguez et al. |
| 11,158,938 | B2 | 10/2021 | Rodriguez et al. |
| 11,424,541 | B2 | 8/2022 | Rodriguez |
| 11,735,815 | B2 | 8/2023 | Rodriguez et al. |
| 2003/0098812 | A1 | 5/2003 | Ying et al. |
| 2005/0088358 | A1 | 4/2005 | Larry et al. |
| 2005/0248418 | A1 | 11/2005 | Govind et al. |
| 2006/0152411 | A1 | 7/2006 | Iguchi et al. |
| 2006/0281423 | A1 | 12/2006 | Caimi et al. |
| 2007/0069958 | A1 | 3/2007 | Ozkar |
| 2008/0088510 | A1 | 4/2008 | Murata et al. |
| 2009/0224991 | A1 | 9/2009 | Rowson et al. |
| 2009/0236701 | A1 | 9/2009 | Sun et al. |
| 2009/0322619 | A1 | 12/2009 | Ollikainen et al. |
| 2010/0304693 | A1 | 12/2010 | Uejima et al. |
| 2011/0133994 | A1 | 6/2011 | Korva |
| 2013/0099987 | A1 | 4/2013 | Desclos et al. |
| 2013/0147672 | A1 | 6/2013 | Desclos et al. |
| 2014/0266938 | A1 | 9/2014 | Ouyang et al. |
| 2014/0333496 | A1 | 11/2014 | Hu et al. |
| 2015/0022408 | A1* | 1/2015 | Shamblin ............. H01Q 9/0442 343/745 |
| 2016/0134349 | A1 | 5/2016 | Ljung et al. |
| 2016/0218431 | A1 | 7/2016 | Gaddi et al. |
| 2016/0302319 | A1 | 10/2016 | Ferretti et al. |
| 2016/0352006 | A1 | 12/2016 | Shtrom et al. |
| 2017/0324148 | A1 | 11/2017 | Stevenson et al. |
| 2018/0090847 | A1 | 3/2018 | Romano et al. |
| 2018/0219276 | A1* | 8/2018 | Han ....................... H01Q 5/335 |
| 2018/0263561 | A1 | 9/2018 | Jones |
| 2018/0294569 | A1 | 10/2018 | Hoang et al. |
| 2019/0007120 | A1* | 1/2019 | Hu ....................... H01Q 9/0421 |
| 2021/0184358 | A1 | 6/2021 | Rodriguez et al. |
| 2024/0006770 | A1 | 1/2024 | Rodriguez et al. |

FOREIGN PATENT DOCUMENTS

| | | |
|---|---|---|
| JP | 2007-037109 | 2/2007 |
| JP | 2008-278218 | 11/2008 |
| KR | 10-2009-0057350 A | 6/2009 |
| WO | WO 2008/103102 | 8/2008 |
| WO | WO 2014/046710 | 3/2014 |
| WO | WO 2016/059960 | 4/2016 |

OTHER PUBLICATIONS

Zetterberg et al., Project Name: Millimetre-Wave Based Mobile Radio Access Network for Fifth Generation Integrated Communications (mmMAGIC), “Initial multi-node and antenna transmitter and receiver architectures and schemes,” dated Mar. 31, 2016, 140 pages.

International Search Report and Written Opinion of the International Searching Authority for International Application No. PCT/US2017/065172 dated Mar. 29, 2018, in 12 pages.

Written Opinion from Singapore Patent Office for Application No. 11201905304S, dated Jun. 30, 2020, in 7 pages.

* cited by examiner

=CASE METALLIZATION (TOP METAL)

=UNDERLYING ANTENNA CARRIER AND VIAS

=UNDERLYING ANTENNA METAL

=CASE METAL OXIDE

=CASE METALLIZATION (TOP METAL)

=UNDERLYING ANTENNA CARRIER AND VIAS

=UNDERLYING ANTENNA METAL

=CASE METAL OXIDE

=CASE METALLIZATION (TOP METAL)
=UNDERLYING ANTENNA CARRIER AND VIAS
=ANTENNA METAL
=CASE METAL OXIDE
=UNDERLYING PARASITIC ELEMENT

RECONFIGURABLE ANTENNA SYSTEMS INTEGRATED WITH METAL CASE

CROSS-REFERENCE TO RELATED APPLICATIONS

This application is a continuation of U.S. application Ser. No. 17/448,818, filed Sep. 24, 2021 and titled "RECONFIGURABLE ANTENNA SYSTEMS INTEGRATED WITH METAL CASE," which is a continuation of U.S. application Ser. No. 16/861,581, filed Apr. 29, 2020 and titled "RECONFIGURABLE ANTENNA SYSTEMS INTEGRATED WITH METAL CASE," which claims the benefit of priority under 35 U.S.C. § 119 of U.S. Provisional Patent Application No. 62/841,668, filed May 1, 2019 and titled "RECONFIGURABLE ANTENNA SYSTEMS INTEGRATED WITH METAL CASE," each of which is herein incorporated by reference in its entirety.

BACKGROUND

Field

Embodiments of the invention relate to electronic systems, and in particular, to radio frequency (RF) electronics.

Description of Related Technology

A radio frequency (RF) communication system can include a transceiver, a front end, and one or more antennas for wirelessly transmitting and receiving signals. The front end can include low noise amplifier(s) for amplifying signals received via the antenna(s), and power amplifier(s) for boosting signals for transmission via the antenna(s).

Examples of RF communication systems include, but are not limited to, mobile phones, tablets, base stations (including macro cell base stations and small cell base stations), network access points, customer-premises equipment (CPE), laptops, and wearable electronics.

SUMMARY

In certain embodiments, the present disclosure relates to user equipment for a wireless network. The user equipment includes electronic circuitry, a metal case housing the electronic circuitry and forming a portion of an exterior surface of the user equipment, and an antenna system including a first antenna element and a first tuning conductor spaced apart from the first antenna element and operable to load the first antenna element, at least one of the first antenna element or the first tuning conductor formed in the metal case.

In various embodiments, the user equipment further includes a first switch electrically connected to the first tuning conductor. According to several embodiments, a state of the first switch is operable to tune a bandwidth of the first antenna element. In accordance with a number of embodiments, the first switch is configured to electrically connect the first tuning conductor to a ground voltage in an on state, and to disconnect the first tuning conductor from the ground voltage in an off state.

In some embodiments, the antenna system further includes a second tuning conductor spaced apart from the first antenna element and operable to load the first antenna element. According to several embodiments, the first tuning conductor and the second tuning conductor are positioned along a perimeter of the first antenna element.

In a number of embodiments, the metal case is plasma processed.

In several embodiments, both the first antenna element and the first tuning conductor are formed in the metal case. According to various embodiments, the first antenna element and the first tuning conductor are separated by an insulator. In accordance to some embodiments, the insulator has different electromagnetic characteristics than metallization of the metal case. According to a number of embodiments, the insulator includes a metal oxide region.

In some embodiments, the first antenna element is formed in the metal case and the first tuning conductor underlies the metal case.

In various embodiments, the first tuning conductor is formed in the metal case and the first antenna element underlies the metal case. According to a number of embodiments, the user equipment further includes an insulator in the metal case, the first antenna element configured to transmit an electromagnetic wave through the insulator. In accordance with some embodiments, the insulator has different electromagnetic characteristics than metallization of the metal case. According to several embodiments, the insulator includes a metal oxide region. In accordance with a number of embodiments, the user equipment further includes an insulator region in the metal case, the first antenna element configured to receive an electromagnetic wave through the insulator. According to some embodiments, the insulator has different electromagnetic characteristics than metallization of the metal case. In accordance with several embodiments, the insulator includes a metal oxide region. According to a number of embodiments, the user equipment further includes an antenna carrier supporting the first antenna element.

In various embodiments, a first portion of the first tuning conductor is formed from the metal case, and a second portion of the first tuning conductor underlies the metal case. According to several embodiments, the first antenna element is formed in the metal case and is coplanar with the first portion of the first tuning conductor. In accordance with a number of embodiments, the second portion of the first tuning conductor underlies the first antenna element.

In some embodiments, the antenna system includes an array of antenna elements including the first antenna element. According to various embodiments, the electronic circuitry is configured to use the array for beamforming communications. In accordance with a number of embodiments, the electronic circuitry is configured to use the array for multiple-input multiple-output communications.

In several embodiments, the user equipment further includes an antenna carrier securing the antenna system. According to a number of embodiments, the user equipment further includes a semiconductor die attached to the antenna carrier and configured to process one or more radio frequency signals associated with the first antenna element. In accordance with various embodiments, the semiconductor die is attached to a side of the antenna carrier opposite the first antenna element. According to some embodiments, the antenna carrier includes a circuit board. In accordance with a number of embodiments, the antenna carrier includes a packaged module. According to various embodiments, the antenna carrier includes a laminated substrate.

In some embodiments, the user equipment is implemented as a mobile phone.

In certain embodiments, the present disclosure relates to an antenna assembly for a wireless communication system. The antenna assembly includes an antenna system including a first antenna element and a first tuning conductor spaced apart from the first antenna element and operable to load the first antenna element, a metal case including at least one of the first antenna element or the first tuning conductor formed therein, and an antenna carrier attached to the metal case and operable to support the antenna system.

In several embodiments, the antenna assembly further includes a first switch on the antenna carrier and electrically connected to the first tuning conductor. According to a number of embodiments, a state of the first switch is operable to tune a bandwidth of the first antenna element. In accordance with various embodiments, the first switch is configured to electrically connect the first tuning conductor to a ground voltage in an on state, and to disconnect the first tuning conductor from the ground voltage in an off state. According to several embodiments, the antenna system further includes a second tuning conductor spaced apart from the first antenna element and operable to load the first antenna element. In accordance with a number of embodiments, the first tuning conductor and the second tuning conductor are positioned around a perimeter of the first antenna element. According to various embodiments, the metal case is plasma processed.

In several embodiments, both the first antenna element and the first tuning conductor are formed in the metal case. In accordance with a number of embodiments, the first antenna element and the first tuning conductor are separated by an insulator. According to various embodiments, the insulator has different electromagnetic characteristics than metallization of the metal case. In accordance with some embodiments, the insulator includes a metal oxide region.

In various embodiments, the first antenna element is formed in the metal case and the first tuning conductor underlies the metal case.

In a number of embodiments, the first tuning conductor is formed in the metal case and the first antenna element underlies the metal case. According to several embodiments, the antenna assembly further includes an insulator in the metal case, and the first antenna element configured to transmit an electromagnetic wave through the insulator. In accordance with some embodiments, the insulator has different electromagnetic characteristics than metallization of the metal case. According to various embodiments, the insulator includes a metal oxide region. In accordance with several embodiments, the antenna assembly further includes an insulator in the metal case, the first antenna element configured to receive an electromagnetic wave through the insulator. According to some embodiments, the insulator has different electromagnetic characteristics than metallization of the metal case. In accordance with various embodiments, the insulator includes a metal oxide region.

In several embodiments, a first portion of the first tuning conductor is formed from the metal case, and a second portion of the first tuning conductor underlies the metal case. According to a number of embodiments, the first antenna element is formed in the metal case and is coplanar with the first portion of the first tuning conductor. In accordance with various embodiments, the second portion of the first tuning conductor underlies the first antenna element.

In some embodiments, the antenna system includes an array of antenna elements including the first antenna element.

In various embodiments, the antenna assembly further includes a semiconductor die attached to the antenna carrier and configured to process one or more radio frequency signals associated with the first antenna element. According to a number of embodiments, the semiconductor die is attached to a side of the antenna carrier opposite the first antenna element.

In several embodiments, the antenna carrier includes a circuit board.

In a number of embodiments, the antenna carrier includes a packaged module.

In various embodiments, the antenna carrier includes a laminated substrate.

In certain embodiments, the present disclosure relates to a method of antenna assembly. The method includes forming at least one of a first antenna element or a first tuning conductor in a metal case, and securing an antenna carrier to the metal case to thereby assemble an antenna system, the antenna system including the first antenna element and the first tuning conductor spaced apart from the first antenna element and operable to load the first antenna element.

In several embodiment, the method further includes electrically connecting a first switch to the first tuning conductor. According to a number of embodiments, electrically connecting the first switch to the first tuning conductor includes connecting the first switch between the first tuning conductor and a ground node.

In some embodiments, forming at least one of the first antenna element or the first tuning conductor in the metal case includes forming both the first antenna element and the first tuning conductor in the metal case. According to a number of embodiments, the method further includes forming a second tuning conductor in the metal case, the second tuning conductor spaced apart from the first antenna element and operable to load the first antenna element. In accordance with various embodiments, the first tuning conductor and the second tuning conductor are positioned around a perimeter of the first antenna element. According to several embodiments, forming both the first antenna element and the first tuning conductor includes processing the metal case to form an insulator separating the first antenna element and the first tuning conductor. In accordance with a number of embodiments, forming both the first antenna element and the first tuning conductor includes processing the metal case with plasma to form the insulator as a metal oxide region separating the first antenna element and the first tuning conductor. According to several embodiments, the method further includes forming an array of antennas including the first antenna element in the metal case.

In some embodiments, forming at least one of the first antenna element or the first tuning conductor in the metal case includes forming the first antenna element in the metal case. According to several embodiments, the method further includes forming the first antenna element in the metal case includes processing the metal case with plasma. In accordance with a number of embodiments, the method further includes positioning the first tuning conductor to underlie the metal case. According to various embodiments, the method further includes forming an array of antennas including the first antenna element in the metal case.

In several embodiments, the method further includes forming at least one of the first antenna element or the first tuning conductor in the metal case includes forming the first tuning conductor in the metal case. In accordance with a number of embodiments, the method further includes positioning the first antenna element to underlie the metal case. According to various embodiments, the method further includes processing the metal case using processing to form an insulator window for the first antenna element. In accordance with several embodiments, the method further includes processing the metal case using plasma processing to form the insulator window as a metal oxide region. According to a number of embodiments, forming the first antenna element in the metal case includes processing the metal case with plasma. In accordance with various embodiments, the method further includes positioning an array of antennas including the first antenna element to underlie the metal case.

In some embodiments, securing the antenna carrier to the metal case includes attaching a circuit board to the metal case.

In a number of embodiments, securing the antenna carrier to the metal case includes attaching a packaged module to the metal case.

In various embodiments, securing the antenna carrier to the metal case includes attaching a laminated substrate to the metal case.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
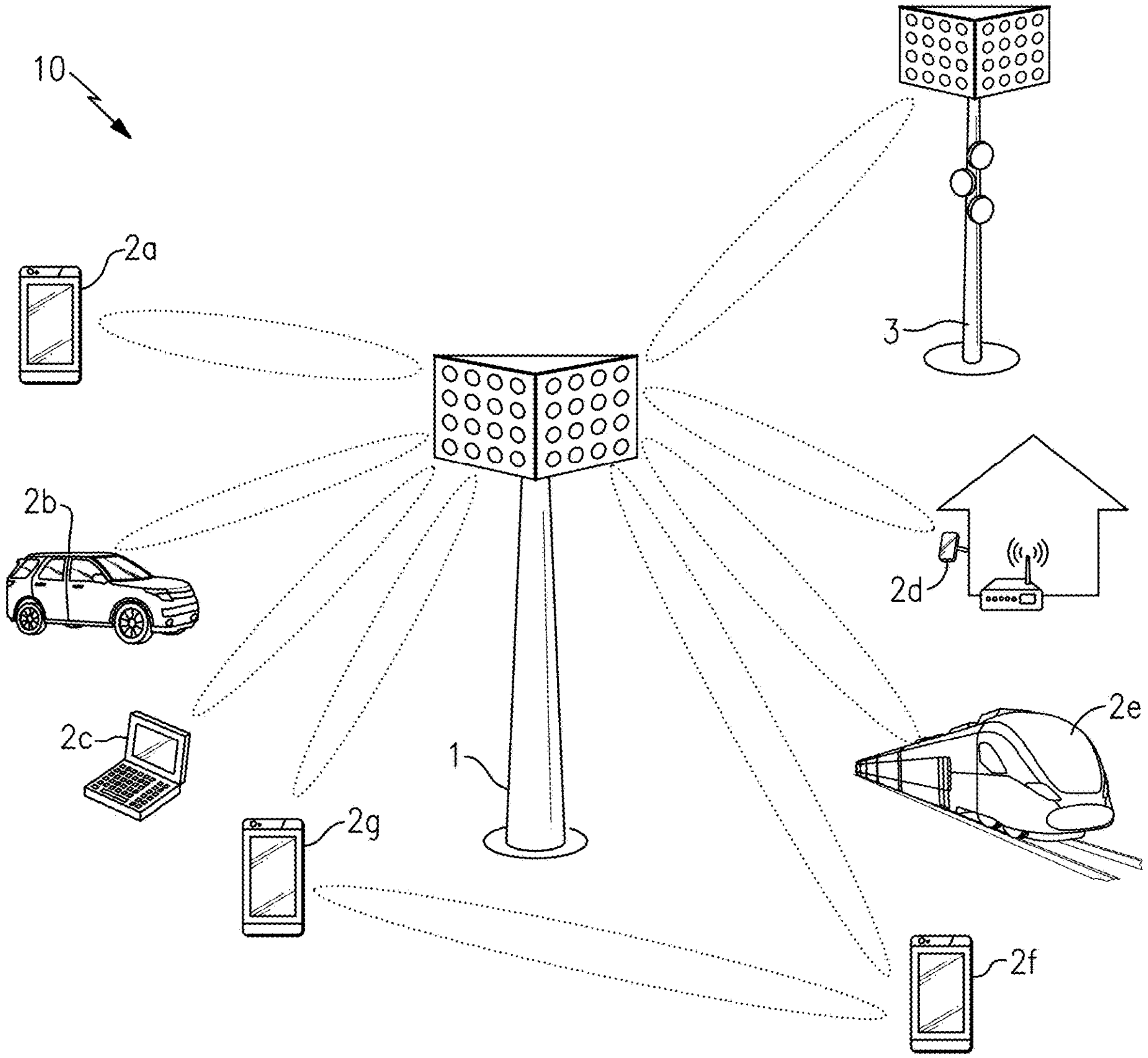
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2019). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2*a*, a wireless-connected car 2*b*, a laptop 2*c*, a stationary wireless device 2*d*, a wireless-connected train 2*e*, a second mobile device 2*f*, and a third mobile device 2*g*.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2*g* and mobile device 20.

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
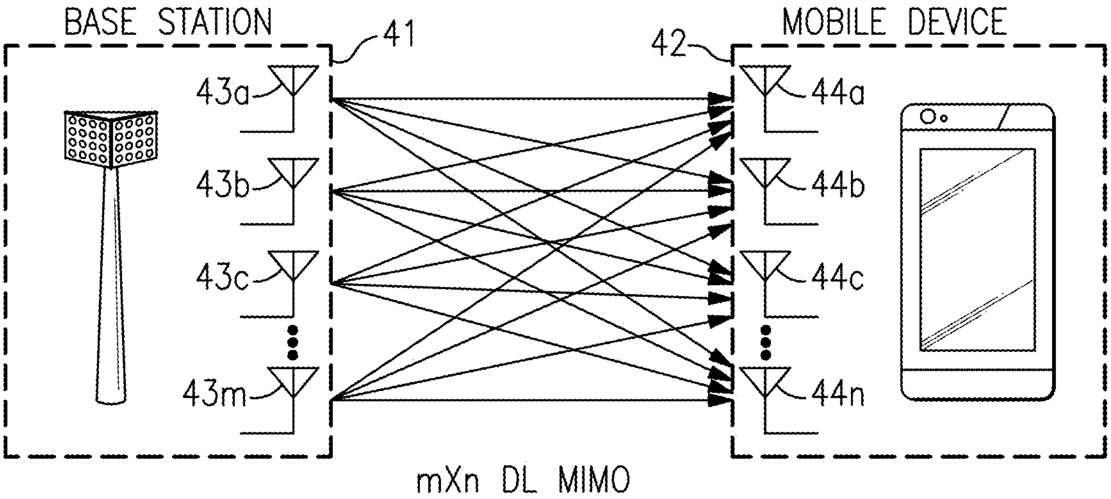
FIG. 2A is a schematic diagram of one example of a downlink channel using multi-input and multi-output (MIMO) communications.
Figure 2B:
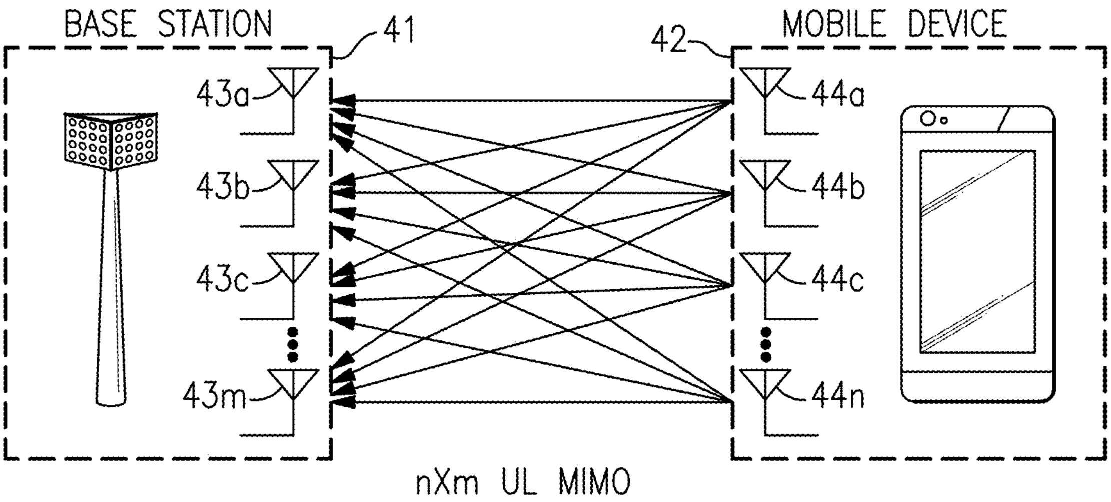
FIG. 2B is schematic diagram of one example of an uplink channel using MIMO communications.

FIG. 2A is a schematic diagram of one example of a downlink channel using multi-input and multi-output (MIMO) communications. FIG. 2B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 2A, downlink MIMO communications are provided by transmitting using M antennas 43*a*, 43*b*, 43*c*, . . . 43*m* of the base station 41 and receiving using N antennas 44*a*, 44*b*, 44*c*, . . . 44*n* of the mobile device 42. Accordingly, FIG. 2A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 2B, uplink MIMO communications are provided by transmitting using N antennas 44*a*, 44*b*, 44*c*, . . . 44*n* of the mobile device 42 and receiving using M antennas 43*a*, 43*b*, 43*c*, . . . 43*m* of the base station 41. Accordingly, FIG. 2B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 2C:
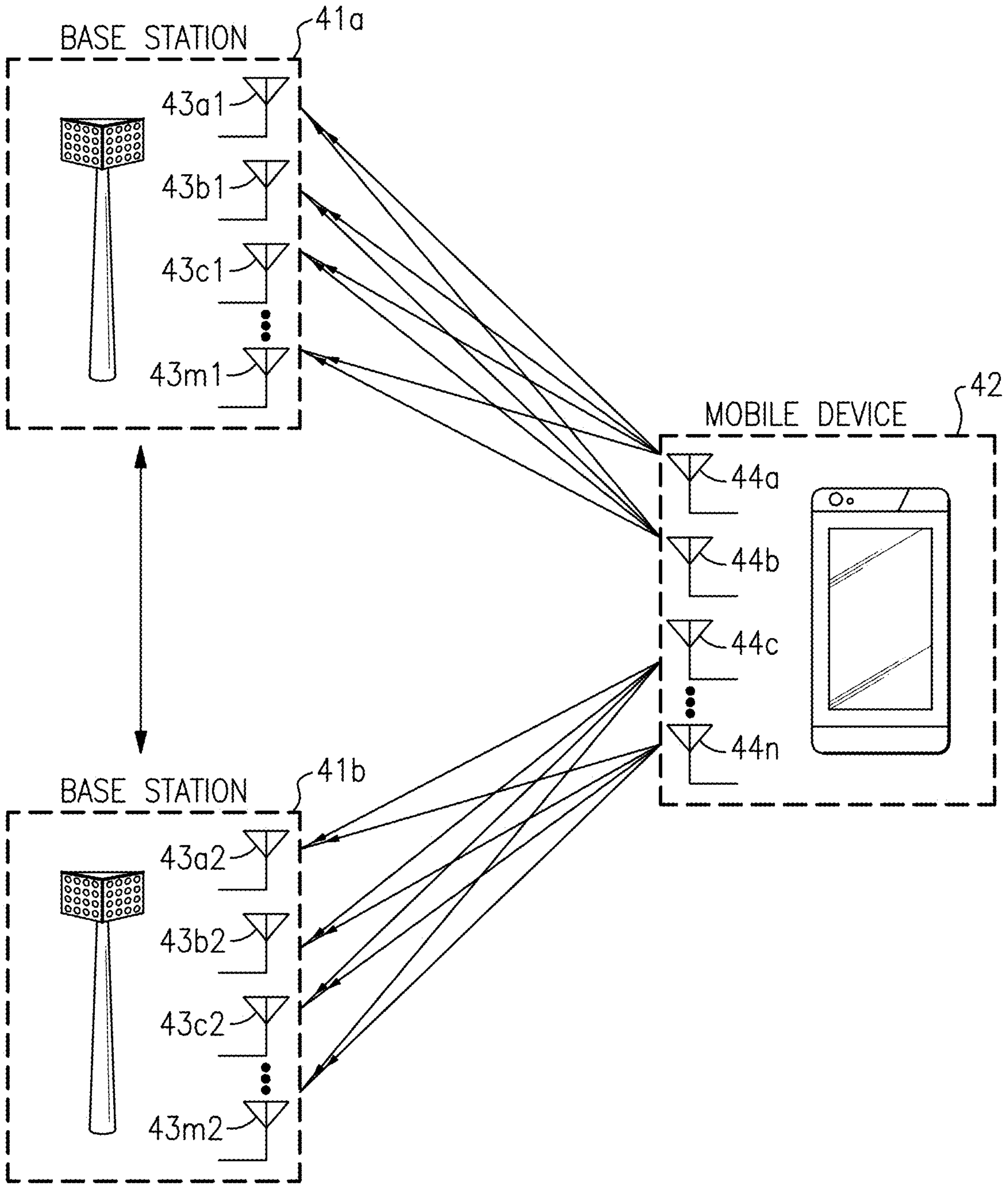
FIG. 2C is schematic diagram of another example of an uplink channel using MIMO communications.

FIG. 2C is schematic diagram of another example of an uplink channel using MIMO communications. In the example shown in FIG. 2C, uplink MIMO communications are provided by transmitting using N antennas 44*a*, 44*b*, 44*c*, . . . 44*n* of the mobile device 42. Additional a first portion of the uplink transmissions are received using M antennas 43*a*1, 43*b*1, 43*c*1, 43*m*1 of a first base station 41*a*, while a second portion of the uplink transmissions are received using M antennas 43*a*2, 43*b*2, 43*c*2, 43*m*2 of a second base station 41*b*. Additionally, the first base station 41*a* and the second base station 41*b* communication with one another over wired, optical, and/or wireless links.

The MIMO scenario of FIG. 2C illustrates an example in which multiple base stations cooperate to facilitate MIMO communications.

Figure 3A:
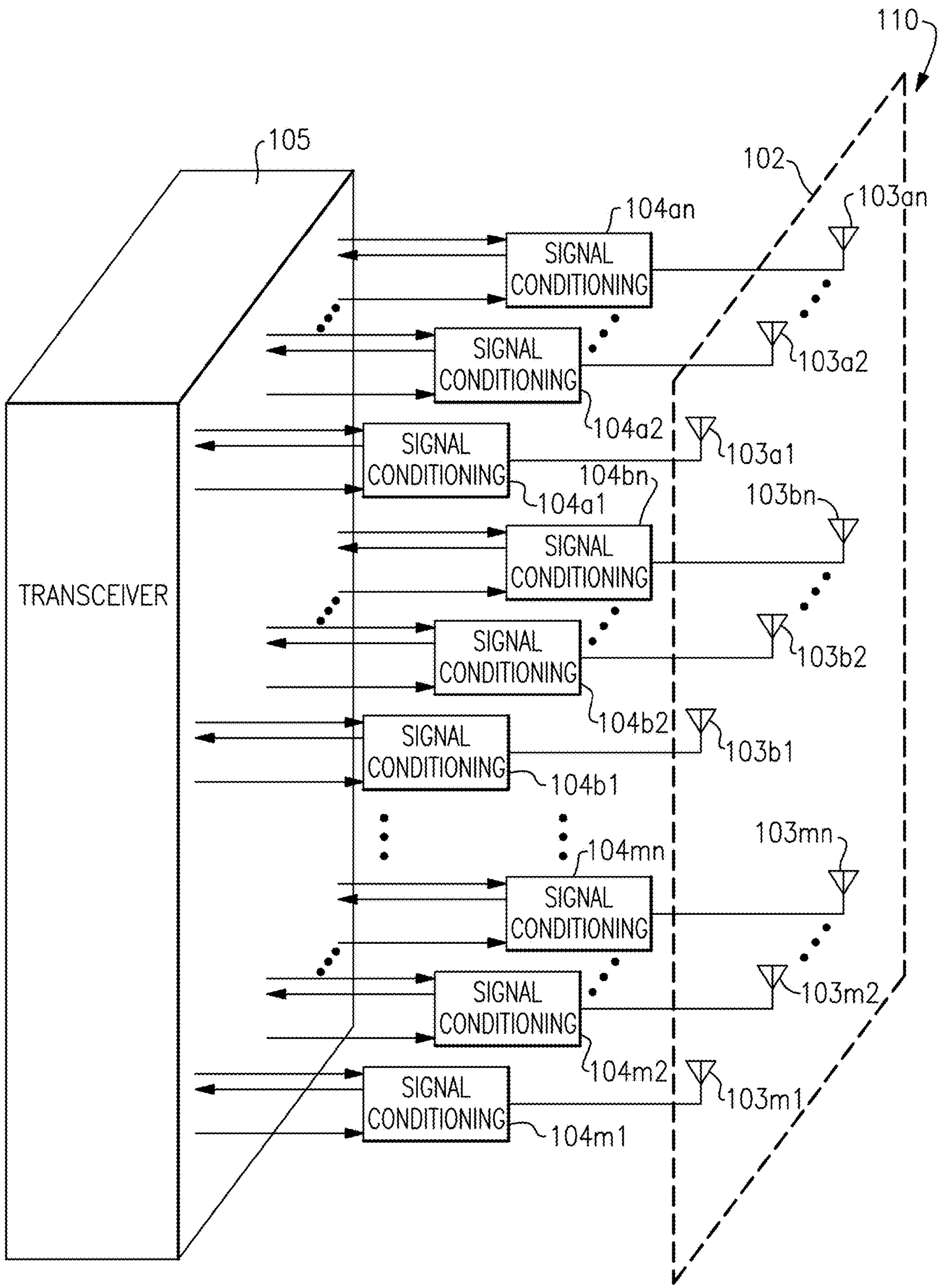
FIG. 3A is a schematic diagram of one example of a communication system that operates with beamforming.

FIG. 3A is a schematic diagram of one example of a communication system 110 that operates with beamforming. The communication system 110 includes a transceiver 105, signal conditioning circuits 104*a*1, 104*a*2 . . . 104*an*, 104*b*1, 104*b*2 . . . 104*bn*, 104*m*1, 104*m*2 . . . 104*mn*, and an antenna array 102 that includes antenna elements 103*a*1, 103*a*2 . . . 103*an*, 103*b*1, 103*b*2 . . . 103*bn*, 103*m*1, 103*m*2 . . . 103*mn*.

Communication systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 3A, the transceiver 105 generates control signals for the signal conditioning circuits. The control signals can be used for a variety of functions, such as controlling the gain and phase of transmitted and/or received signals to control beamforming.

Figure 3B:
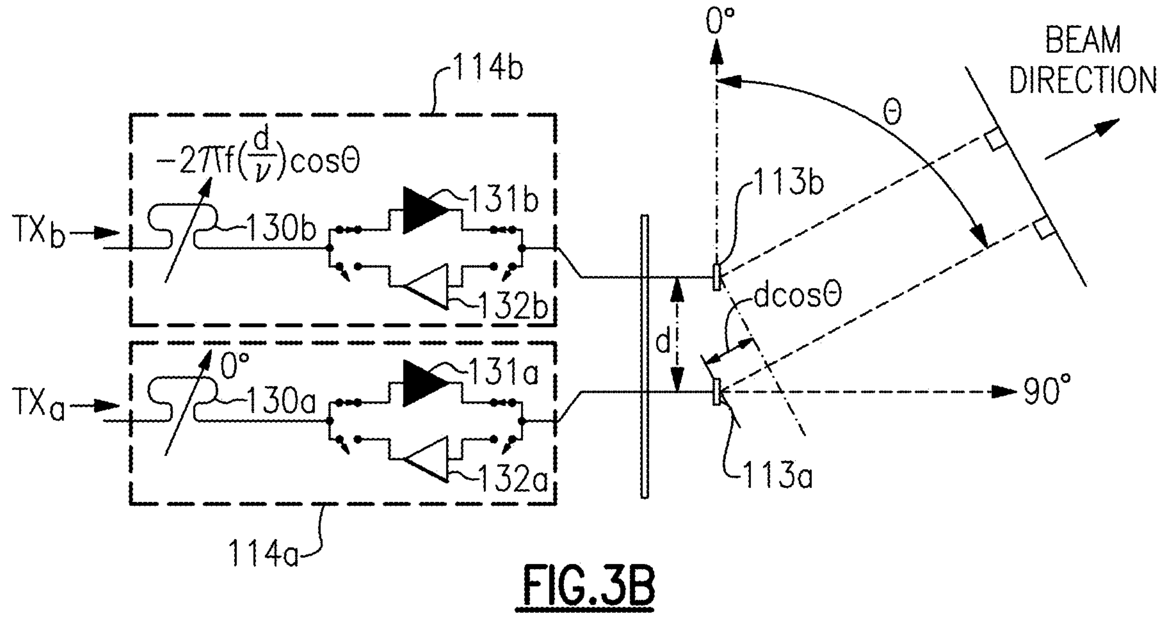
FIG. 3B is a schematic diagram of one example of beamforming to provide a transmit beam.

FIG. 3B is a schematic diagram of one example of beamforming to provide a transmit beam. FIG. 3B illustrates a portion of a communication system including a first signal conditioning circuit 114*a*, a second signal conditioning circuit 114*b*, a first antenna element 113*a*, and a second antenna element 113*b*.

Although illustrated as included two antenna elements and two signal conditioning circuits, a communication system can include additional antenna elements and/or signal conditioning circuits. For example, FIG. 3B illustrates one embodiment of a portion of the communication system 110 of FIG. 3A.

The first signal conditioning circuit 114*a* includes a first phase shifter 130*a*, a first power amplifier 131*a*, a first low noise amplifier (LNA) 132*a*, and switches for controlling selection of the power amplifier 131*a* or LNA 132*a*. Additionally, the second signal conditioning circuit 114*b* includes a second phase shifter 130*b*, a second power amplifier 131*b*, a second LNA 132*b*, and switches for controlling selection of the power amplifier 131*b* or LNA 132*b*.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113*a* and the second antenna element 113*b* are separated by a distance d. Additionally, FIG. 3B has been annotated with an angle θ, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113*a*, 113*b*, a desired transmit beam angle θ can be achieved. For example, when the first phase shifter 130*a* has a reference value of 0°, the second phase shifter 130*b* can be controlled to provide a phase shift of about $-2\pi f(d/v)\cos\theta$ radians, where f is the fundamental frequency of the transmit signal, d is the distance between the antenna elements, v is the velocity of the radiated wave, and π is the mathematic constant pi.

In certain implementations, the distance d is implemented to be about ½λ, where λ is the wavelength of the fundamental component of the transmit signal. In such implementations, the second phase shifter 130*b* can be controlled to provide a phase shift of about $-\pi\cos\theta$ radians to achieve a transmit beam angle θ.

Accordingly, the relative phase of the phase shifters 130*a*, 130*b* can be controlled to provide transmit beamforming. In certain implementations, a baseband processor and/or a transceiver (for example, the transceiver 105 of FIG. 3A) controls phase values of one or more phase shifters and gain values of one or more controllable amplifiers to control beamforming.

Figure 3C:
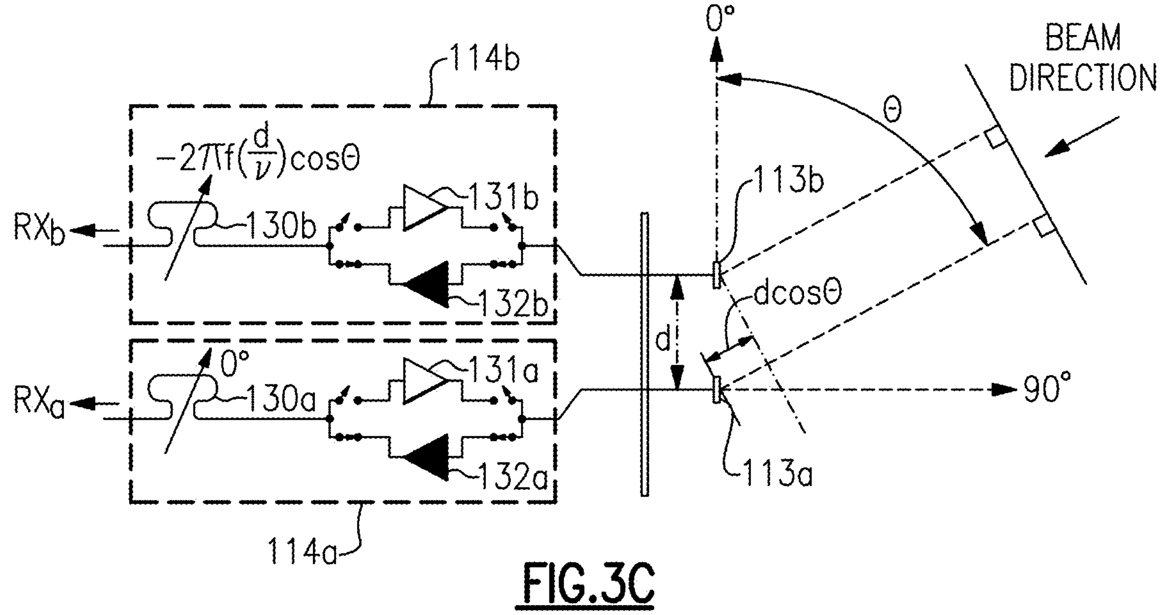
FIG. 3C is a schematic diagram of one example of beamforming to provide a receive beam.

FIG. 3C is a schematic diagram of one example of beamforming to provide a receive beam. FIG. 3C is similar to FIG. 3B, except that FIG. 3C illustrates beamforming in the context of a receive beam rather than a transmit beam.

As shown in FIG. 3C, a relative phase difference between the first phase shifter 130*a* and the second phase shifter 130*b* can be selected to about equal to $-2\pi f(d/v)\cos\theta$ radians to achieve a desired receive beam angle θ. In implementations in which the distance d corresponds to about ½λ, the phase difference can be selected to about equal to $-\pi\cos\theta$ radians to achieve a receive beam angle θ.

Although various equations for phase values to provide beamforming have been provided, other phase selection values are possible, such as phase values selected based on implementation of an antenna array, implementation of signal conditioning circuits, and/or a radio environment.

Examples of Reconfigurable Antenna Systems Integrated with Metal Case

When an antenna is placed behind a conductive metallized cage, electromagnetic waves are blocked from reaching the antenna. Moreover, electromagnetic waves radiated from the antenna are unable to penetrate the conductive metalized enclosure. Thus, the conductive metalized enclosure is well-suited for a shielding application, but undesirable for placing an antenna within the enclosure.

Reconfigurable antenna systems integrated with a metal case are provided herein. In certain embodiments, user equipment (UE) for a cellular network includes a metal case and an antenna system for transmitting and/or receiving wireless signals. The antenna system includes an antenna element and a tuning conductor that is spaced apart from the antenna element and operable to load the antenna element. At least one of the antenna element or the tuning conductor is formed in the metal case.

For example, a plasma process can be used to create transparent electromagnetic windows at a given frequency while shielding underlying components from spurious signals at other frequencies. Such plasma shielding processes can be used to turn conductive regions of the metal case into non-conductive metal oxide, thereby providing a mechanism for electrical isolation between various regions of the metal case. Thus, although the metal case or housing can include a continuous metal layer prior to processing, the metal case can be processed to form at least one of the antenna element or the tuning conductor.

One example of a plasma process for a metal case is set forth in US 2016/0302319 A1 to Ferretti et al., which is expressly incorporated by reference in its entirety herein, and its disclosure is to be considered part of the specification of the present application. Any combination of features described in Ferretti et al. can be implemented in combination with the antenna systems herein.

In certain implementations, the antenna system further includes a switch that is electrically connected between the tuning conductor and a reference voltage, such as ground. For example, the switch can be used to selectively connect the tuning conductor to ground to provide tuning to the antenna element.

Thus, antenna element(s) and/or tuning conductor(s) can be created on a conductive layer using plasma processing. Additionally, each tuning conductor can be connected to an underlying switch path for tuning.

By implementing the antenna system in this manner, antenna characteristics of the antenna element can be controlled. For example, when the switch connects the tuning conductor to ground, the tuning conductor provides loading that modifies the operation of the antenna element relative to when the tuning conductor is disconnected from ground (for instance, electrically floating). Such modification can reconfigure the bandwidth and/or other operating parameters of the antenna system.

Thus, freedom is provided for reconfiguring the bandwidth of the antenna system, while high integration is achieved by forming the antenna system at least in part in the metal case.

In certain implementations, the antenna system is connected to an RF front end that includes at least one of a power amplifier for amplifying a transmit signal for transmission on the antenna element or a low noise amplifier for amplifying a signal received from the antenna element. The metal case serves to shield components of the RF front end from electromagnetic interference, such as spurious emissions. In certain implementations, the RF front end further include additional shielding structures, such as wire bond shields and/or metal lids suitable for shielding components of the RF front end from electromagnetic interference.

In certain implementations, the antenna system is implemented with multiple tuning conductors for tuning the antenna element. For instance, the antenna element can be tuned by two or more switch-controlled tuning conductors. In such implementations, selection of the state of switches can control a bandwidth and/or a direction of polarization of the antenna element, thereby providing frequency and/or polarization configurability.

Moreover, the switch state of the antenna system can be changed over time, thereby reconfiguring the antenna system to provide desired performance characteristics at a given moment. For example, the state of the switches can be controlled to provide an optimal or near-optimal radiation pattern at a given time for a particular operating environment. Thus, seamless connectivity between UE and a base station can be provided as the UE moves relative to the base station and/or as a signaling environment changes.

In certain implementations, the state of the switches is controlled based on feedback parameters of a communication link between UE and a base station. Thus, the switch state can be set using a control loop, via a closed or semi-closed system, to achieve appropriate antenna characteristics.

In one example, the antenna system can be included UE that is communicating with a base station. Additionally, a receive strength signal indicator (RSSI), an error rate indicator, and/or other signal from the base station can be used to control selection of the switch state of the UE.

Figure 4A:
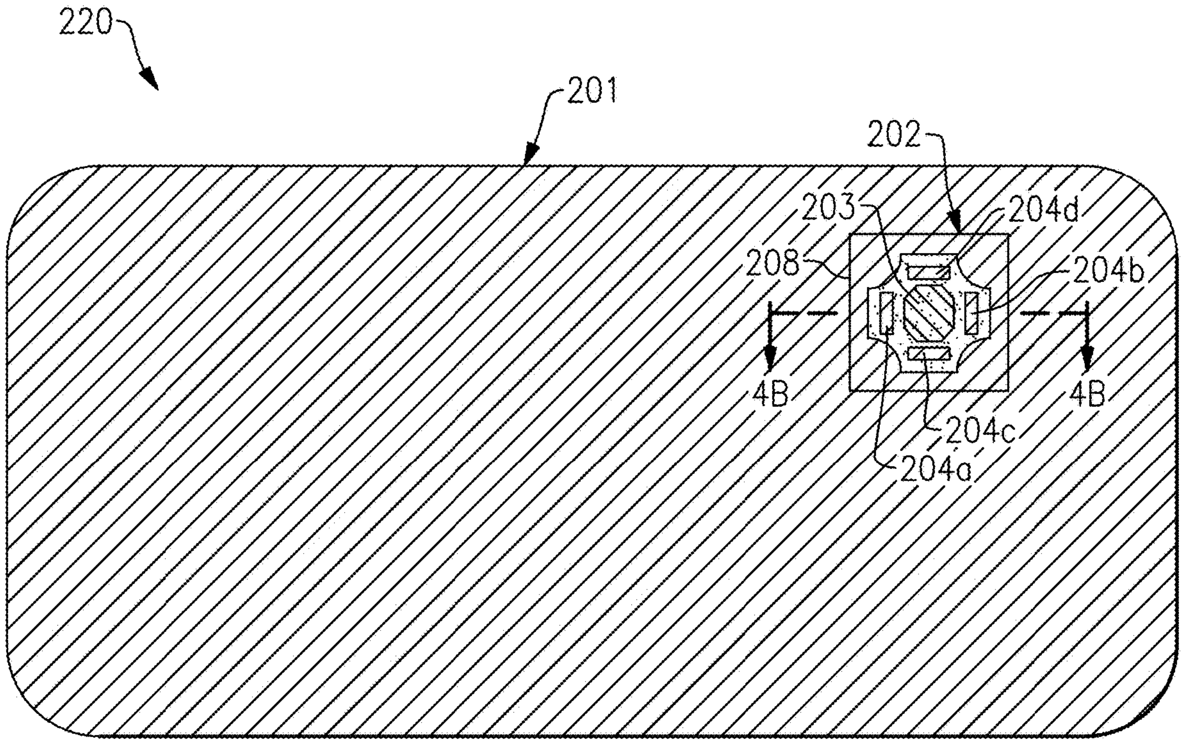
FIG. 4A is a plan view of one embodiment of user equipment (UE).
Figure 4B:
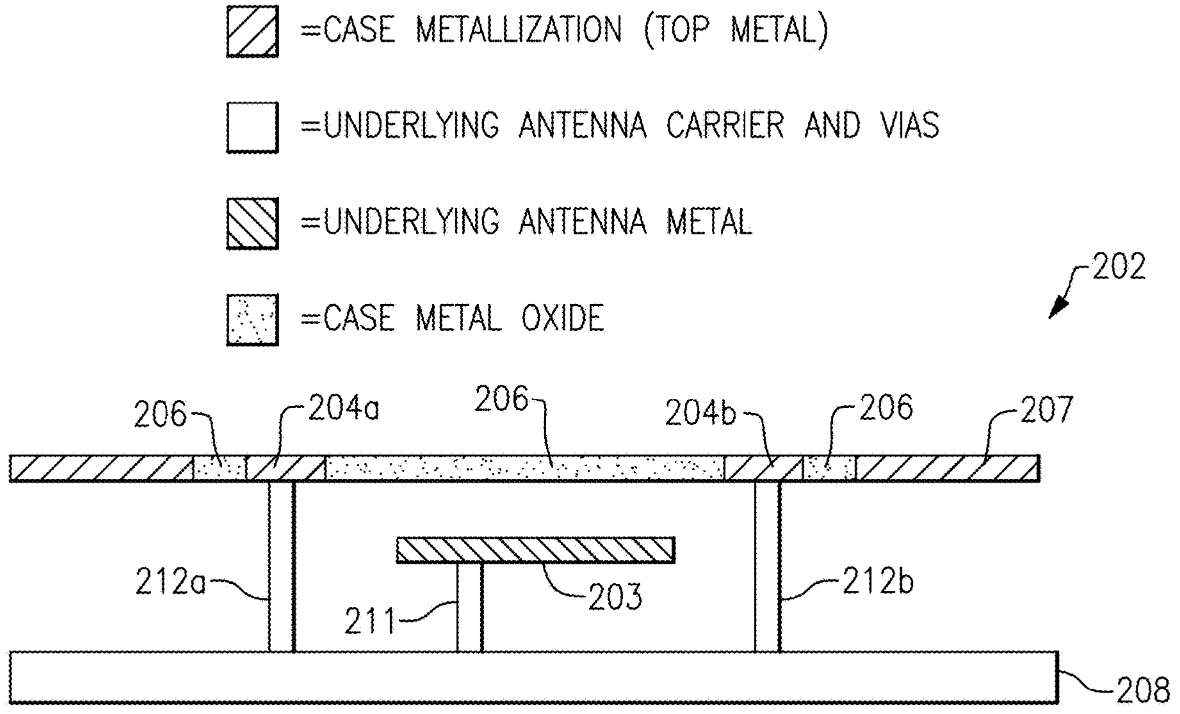
FIG. 4B is a cross section of the UE of FIG. 4A taken along the lines 4B-4B.

FIG. 4A is a plan view of one embodiment of UE 220. FIG. 4B is a cross section of the UE 220 of FIG. 4A taken along the lines 4B-4B. The UE 220 includes a metal case or housing 201 and an antenna system 202. The antenna system 202 includes an antenna element 203, tuning conductors 204*a*-204*d*, an antenna carrier 208, a signal feed 211, and tuning conductor feeds 212*a*-212*b*. The UE 220 can correspond to a wide variety of types of UE, including, but not limited to, a mobile phone or a tablet.

In the illustrated embodiment, the tuning conductors 204*a*-204*d* surround a boundary or perimeter of the antenna element 203, but are spaced apart therefrom. For example, the first tuning conductor 204*a* is positioned adjacent a left side of the antenna element 203, the second tuning conductor 204*b* is positioned adjacent a right side of the antenna element 203, the third tuning conductor 204*c* is positioned adjacent a bottom side of the antenna element 203, and the fourth tuning conductor 204*d* is positioned adjacent a top side of the antenna element 203. Tuning conductors are also referred to herein as parasitic elements.

Although FIGS. 4A and 4B illustrates an implementation of an antenna system with one antenna element and four tuning conductors, an antenna system can include other numbers and/or types of antenna elements and/or tuning conductors.

Furthermore, although the illustrated antenna element 203 is substantially octagonal in shape, an antenna element can be shaped in a wide variety of ways. Additionally, although the illustrated tuning conductors 204*a*-204*b* are substantially rectangular in shape, tuning conductors can be shaped in a wide variety of ways. For example antenna elements and tuning conductors can be implemented with a wide range of shapes, sizes, and/or orientations. Accordingly, other implementations are possible.

The metal case 201 has been patterned to include regions of metal oxide 206. The metal case 201 can be patterned in any suitable way, including, but not limited to, using a plasma process. The regions of metal oxide 206 serve to provide electrical isolation between various regions of the metal case 201. For example, the tuning conductors 204*a*-204*d* are electrically insulated from a region 207 of the metal case 201 that surrounds the antenna system 202.

Plasma processing can be used to create transparent electromagnetic windows in the metal case 201 at a given frequency while shielding components underlying the metal case 201 from spurious signals at other frequencies. Thus, although the metal case 201 includes a continuous metal layer prior to processing, the metal case 201 is processed to form the tuning conductors 204*a*-204*d*, in this example.

In certain implementations, the metal case 201 is opaque to electromagnetic radiation over a wide frequency range, while the metal oxide regions 206 are transparent to electromagnetic radiation over a desired range of frequencies, which can include one or more frequency bands.

In the illustrated embodiment, the antenna element 203 underlies the metal case 201. Additionally, a portion of the metal case 201 above the antenna element 203 has been processed to form case metal oxide 206, thereby allowing signals to transmitted from and received by the antenna element 203.

The antenna carrier 208 serves to support the antenna element 203. Additionally, the signal feed 211 provides an electrical connected between the antenna element 203 and the antenna carrier, thereby allowing RF signals to be communicated. The antenna carrier 208 can be implemented in a wide variety of ways, including, but not limited to, using a circuit board, a laminated substrate, or a packaged module.

In certain implementations, the antenna carrier 208 is implemented using multiple substrates. For example, the antenna element 203 can be disposed on a separate module or laminate that is connected to an underlying PCB which hosts other components.

In certain implementations, the antenna carrier 208 includes at least one semiconductor die attached thereto and operable to process RF signals associated with the antenna element 203. Such RF signals can include an RF signal received on the antenna element 203 and/or an RF signal transmitted on the antenna element 203.

As shown in FIG. 4B, the first tuning conductor feed 212*a* serves to electrically connect the first tuning conductor 204*a* to the carrier substrate 208, and the second tuning conductor feed 212*b* serves to connect the second tuning conductor 204*b* to the carrier substrate 208. Although not depicted in the cross section of FIG. 4B, the third tuning conductor 204*c* and the fourth tuning conductor 204*d* can also be connected to the antenna carrier 208 using tuning conductor feeds.

The tuning conductor feeds can be used to control the voltages of the corresponding tuning conductors to desired electrical potentials, thereby providing control over various operational parameters of the antenna system 202, such as bandwidth and/or direction of polarization. In certain implementations, each tuning conductor feed is electrically connected to a pad of a semiconductor die used to control the voltage of the tuning conductor.

The signal and tuning conductor feeds can be implemented in a wide variety of ways, such as using metal vias.

Figure 5A:
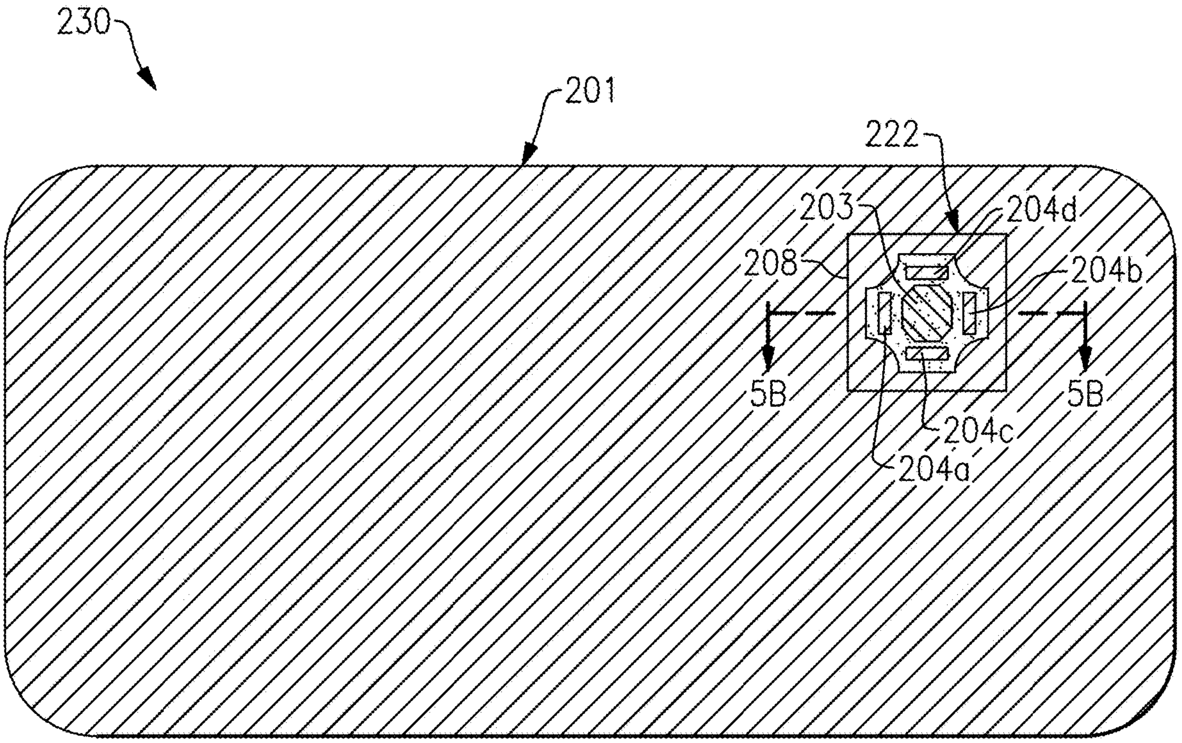
FIG. 5A is a plan view of another embodiment of UE.
Figure 5B:
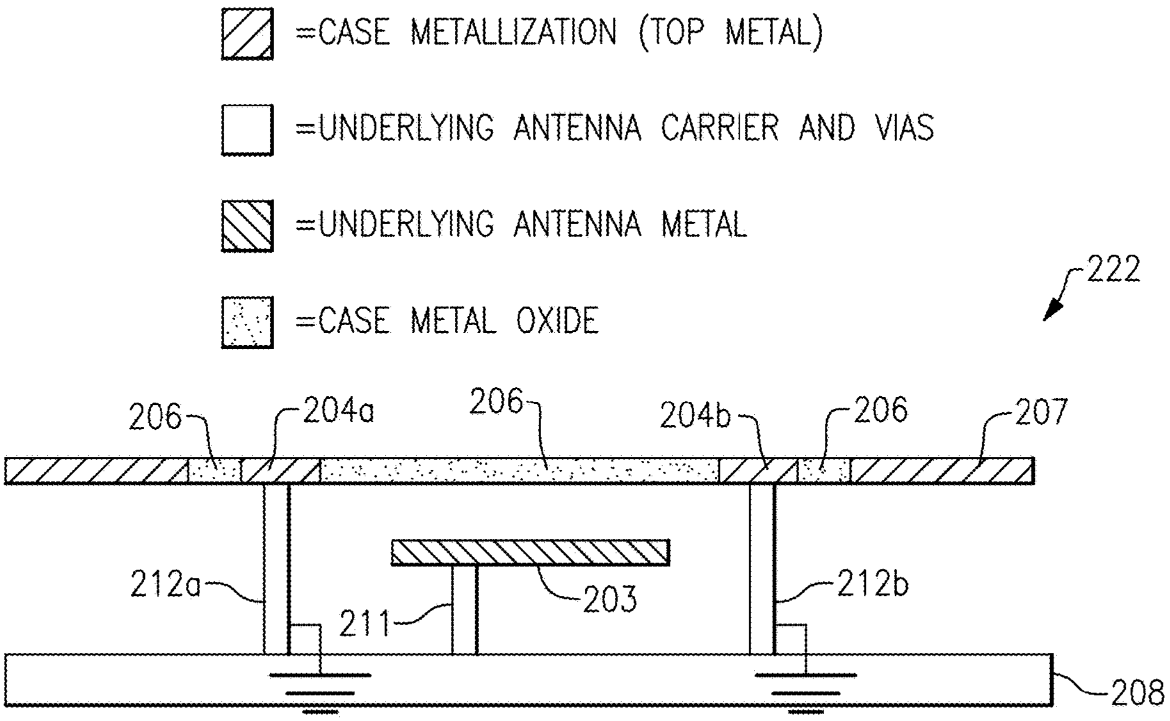
FIG. 5B is a cross section of the UE of FIG. 5A taken along the lines 5B-5B.

FIG. 5A is a plan view of another embodiment of UE 230. FIG. 5B is a cross section of the UE 230 of FIG. 5A taken along the lines 5B-5B. The UE 230 includes a metal case 201 and an antenna system 222. The antenna system 222 includes an antenna element 203, tuning conductors 204*a*-204*d*, an antenna carrier 208, a signal feed 211, and tuning conductor feeds 212*a*-212*b*.

The UE 230 of FIGS. 5A and 5B is similar to the UE 220 of FIGS. 4A and 4B, except that the UE 230 illustrates an implementation in which the tuning conductors are grounded. For example, as shown in FIG. 5B, the first tuning conductor feed 212*a* grounds the first tuning conductor 204*a*, while the second tuning conductor feed 212*b* grounds the second tuning conductor 204*b*.

Figure 6A:
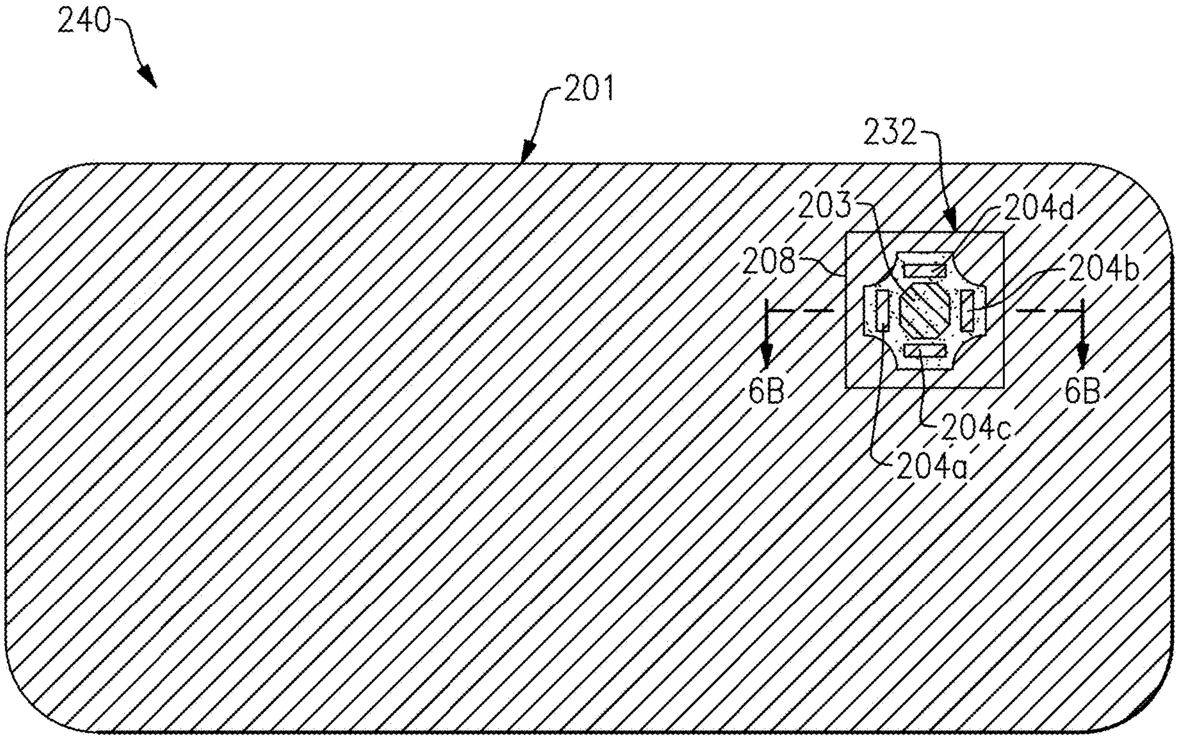
FIG. 6A is a plan view of another embodiment of UE.
Figure 6B:
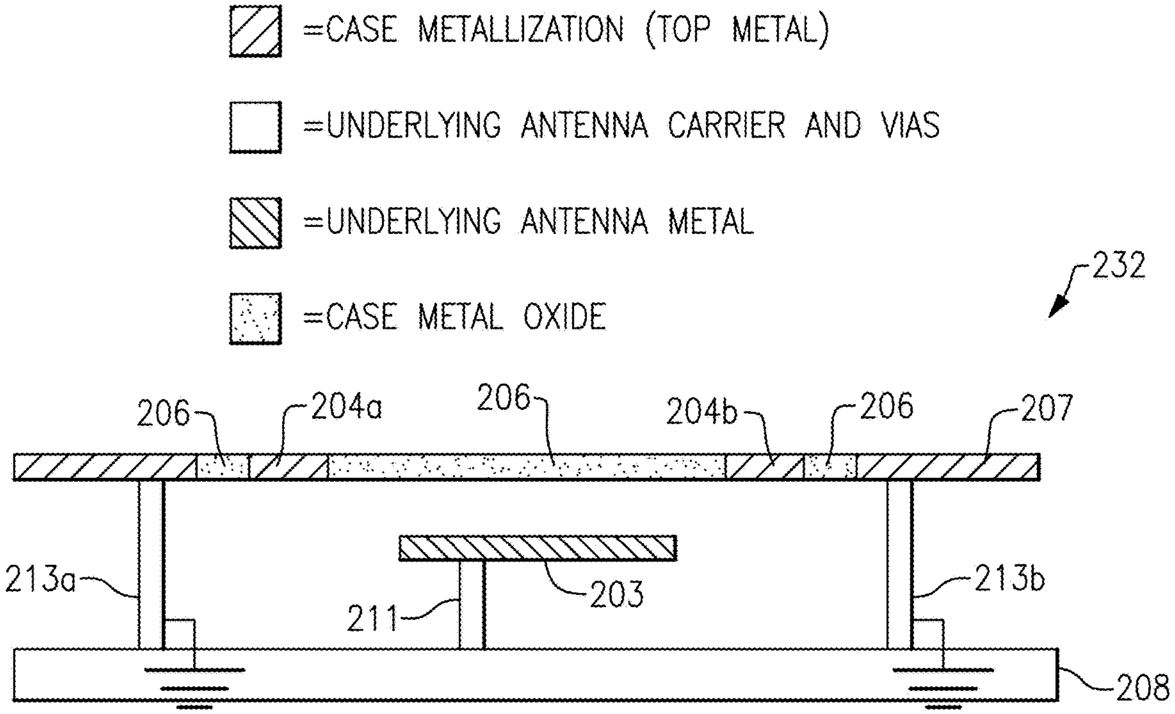
FIG. 6B is a cross section of the UE of FIG. 6A taken along the lines 6B-6B.

FIG. 6A is a plan view of another embodiment of UE 240. FIG. 6B is a cross section of the UE 240 of FIG. 6A taken along the lines 6B-6B. The UE 240 includes a metal case 201 and an antenna system 232. The antenna system 232 includes an antenna element 203, tuning conductors 204*a*-204*d*, an antenna carrier 208, a signal feed 211, and metal case feeds 213*a*-213*b*.

The UE 240 of FIGS. 6A and 6B is similar to the UE 220 of FIGS. 4A and 4B, except that the UE 240 illustrates an implementation in which the tuning conductor feeds are omitted and metal case feeds are included. For example, as shown in FIG. 6B, the first metal case feed 213*a* and the second metal case feed 213*b* serve to ground the region 207 of the metal case 201 surrounding the antenna system 232.

Figure 7A:
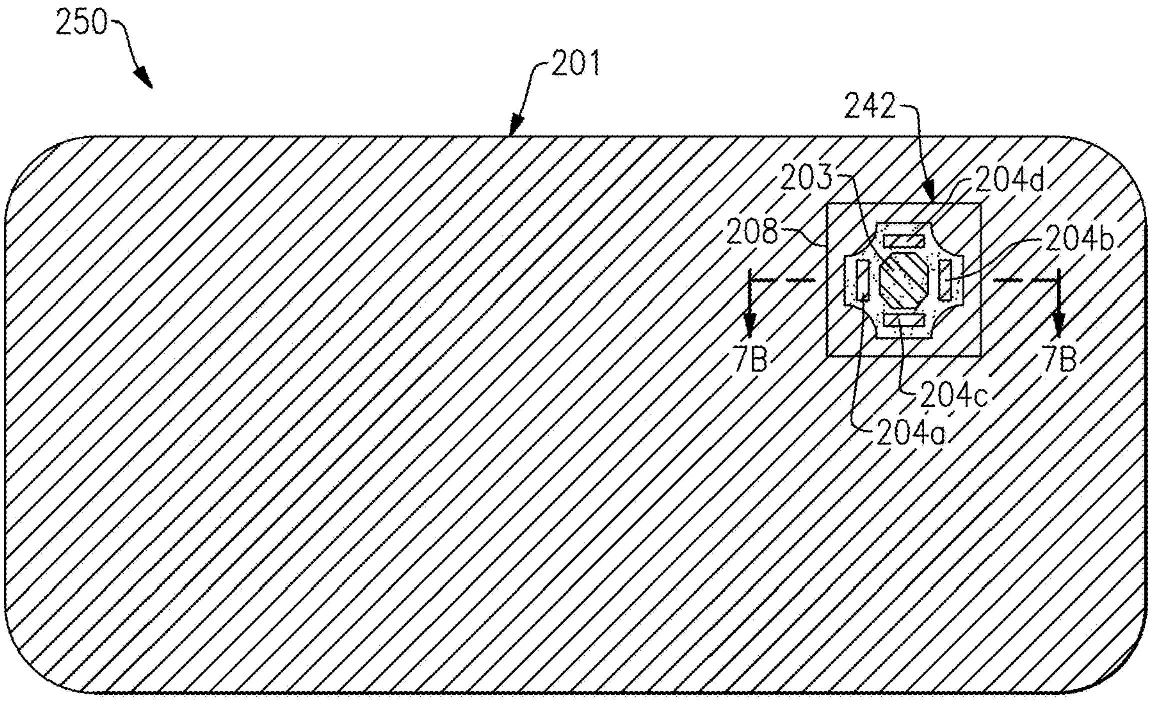
FIG. 7A is a plan view of another embodiment of UE.
Figure 7B:
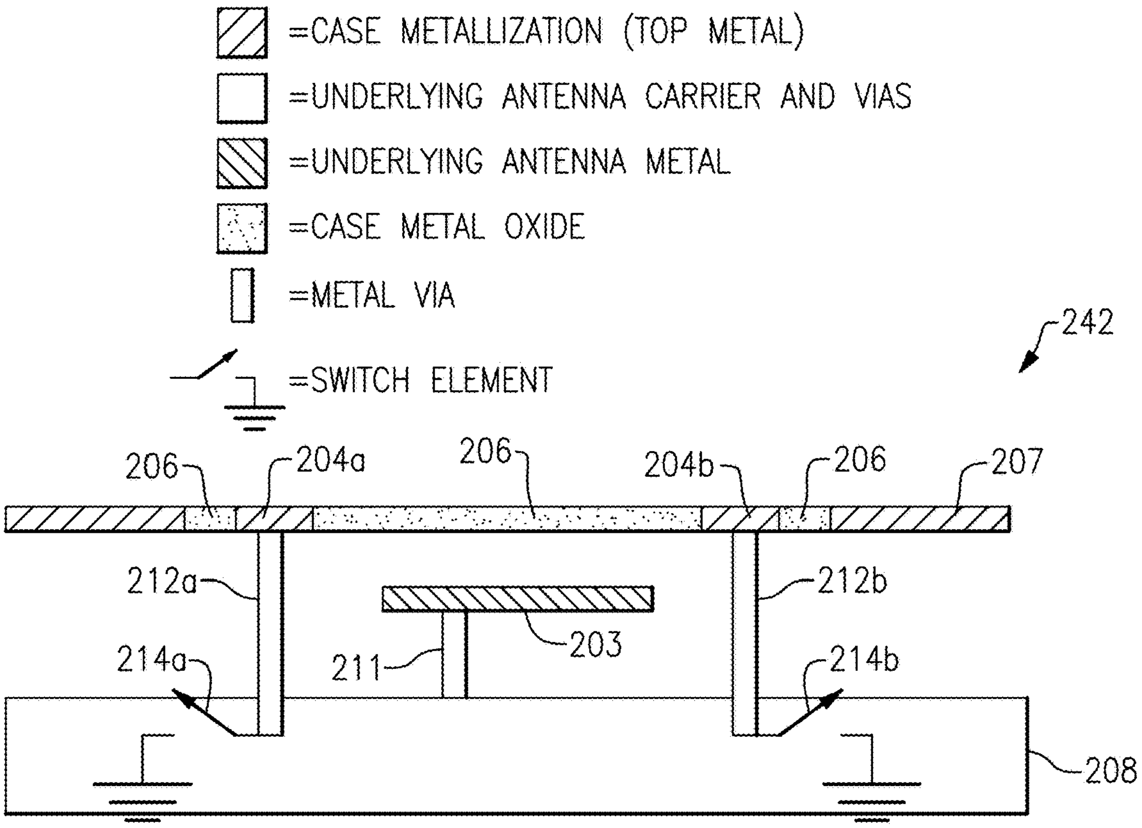
FIG. 7B is a cross section of the UE of FIG. 7A taken along the lines 7B-7B.

FIG. 7A is a plan view of another embodiment of UE 250. FIG. 7B is a cross section of the UE 250 of FIG. 7A taken along the lines 7B-7B. The UE 250 includes a metal case 201 and an antenna system 242. The antenna system 242 includes an antenna element 203, tuning conductors 204*a*-204*d*, an antenna carrier 208, a signal feed 211, tuning conductor feeds 212*a*-212*b*, and switches 214*a*-214*b*.

The UE 250 of FIGS. 7A and 7B is similar to the UE 220 of FIGS. 4A and 4B, except that the UE 250 further includes switches for controlling the voltages of tuning conductors. For example, as shown in FIG. 7B, the first switch 214*a* is included between the first tuning conductor feed 212*a* and ground, and the second switch 214*b* is included between the second tuning conductor feed 212*b* and ground. Although the cross section of FIG. 7B illustrates two switches, each tuning conductor can include a switch. For example, switches can also be included for the third tuning conductor 204*c* and the fourth conductor 204*d*.

By implementing the antenna system 242 with the switches 214*a*-214*b*, antenna characteristics of the antenna element 203 can be controlled. For example, when the first switch 214*a* connects the first tuning conductor 204*a* to ground and/or the second switch 214*b* connects the second tuning conductor 204*b* to ground, the operation of the antenna element 203 is modified relative to when the tuning conductors are disconnected from ground (for instance, electrically floating). Such modification can reconfigure the bandwidth and/or other operating parameters of the antenna system 242.

In certain implementations, the antenna carrier 208 includes a semiconductor die attached thereto and including the switches 214*a*-214*b* fabricated thereon.

The switches 214*a*-214*b* can be implemented in a wide variety of ways, such as by using transistors (for instance, field-effect transistors or FETs), pin diode switches and/or microelectromechanical switches. The control signals to the switches 214*a*-214*b* can be generated in a wide variety of ways. In one example, a transceiver or baseband processor of the UE sets the state of the control signals to the switches 214*a*-214*b* by sending data over a chip interface or bus. In certain implementations, data stored in a programmable memory, such as a non-volatile memory, is used to control the switch state.

Figure 8A:
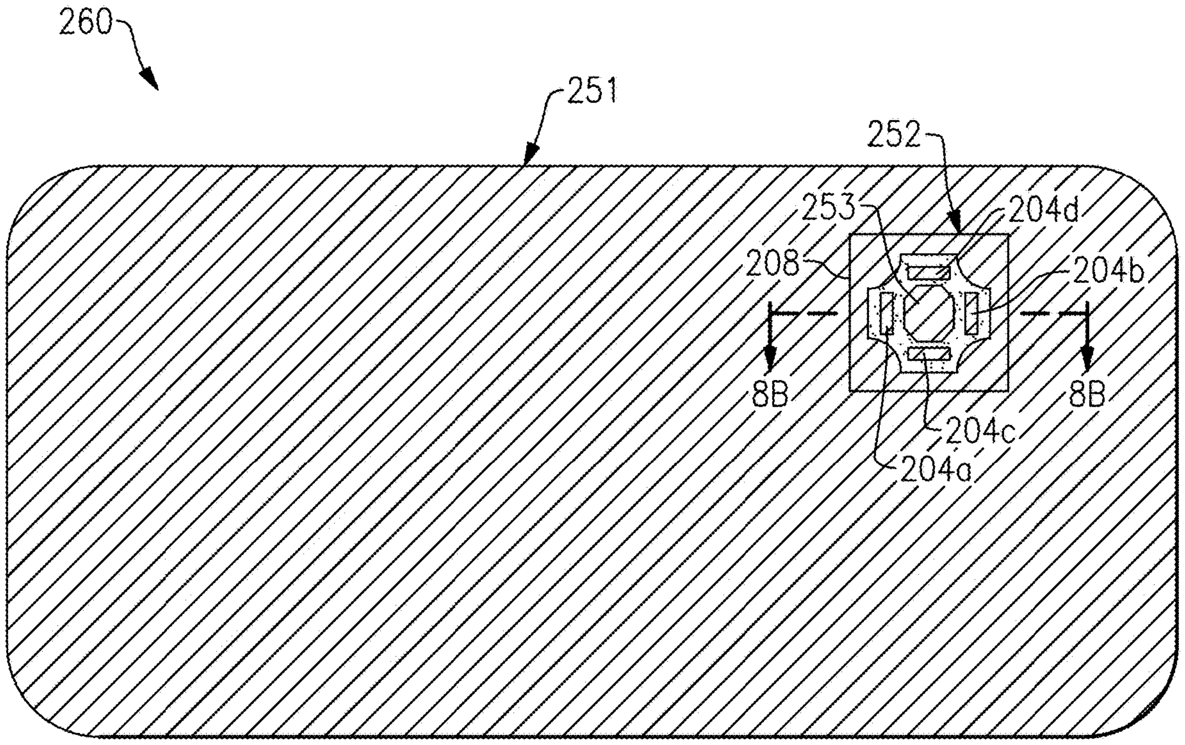
FIG. 8A is a plan view of another embodiment of UE.
Figure 8B:
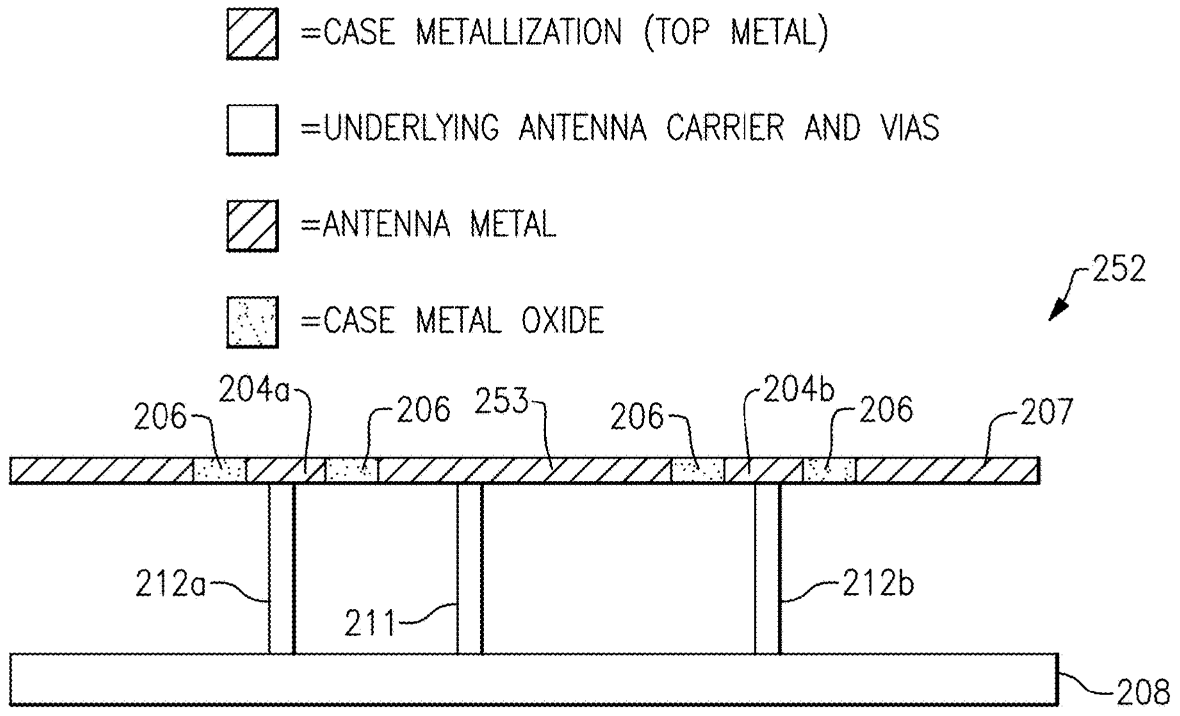
FIG. 8B is a cross section of the UE of FIG. 8A taken along the lines 8B-8B.

FIG. 8A is a plan view of another embodiment of UE 260. FIG. 8B is a cross section of the UE 260 of FIG. 8A taken along the lines 8B-8B. The UE 260 includes a metal case 251 and an antenna system 252. The antenna system 252 includes an antenna element 253, tuning conductors 204*a*-204*d*, an antenna carrier 208, a signal feed 211, and tuning conductor feeds 212*a*-212*b*.

The UE 260 of FIGS. 8A and 8B is similar to the UE 220 of FIGS. 4A and 4B, except that the UE 240 illustrates an implementation in which the antenna element 253 is formed from a portion of the metal case 251. Thus, both the antenna element 253 and the tuning conductors 204*a*-204*d* are formed in the metal case 251, in this embodiment.

Figure 9A:
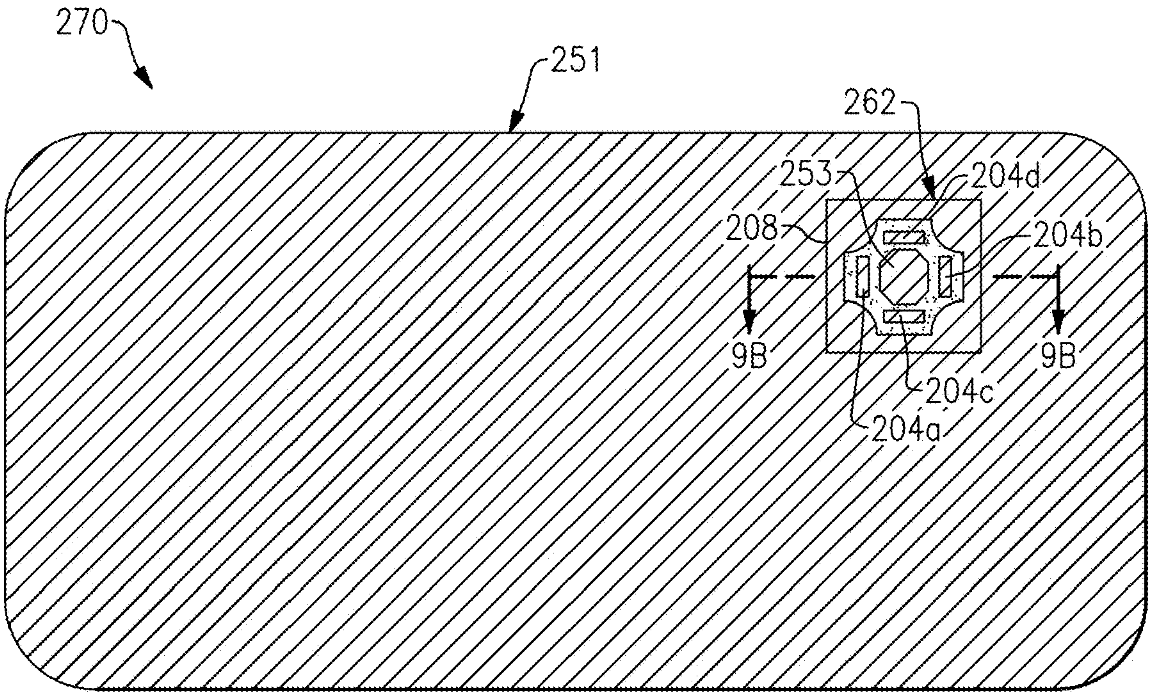
FIG. 9A is a plan view of another embodiment of UE.
Figure 9B:
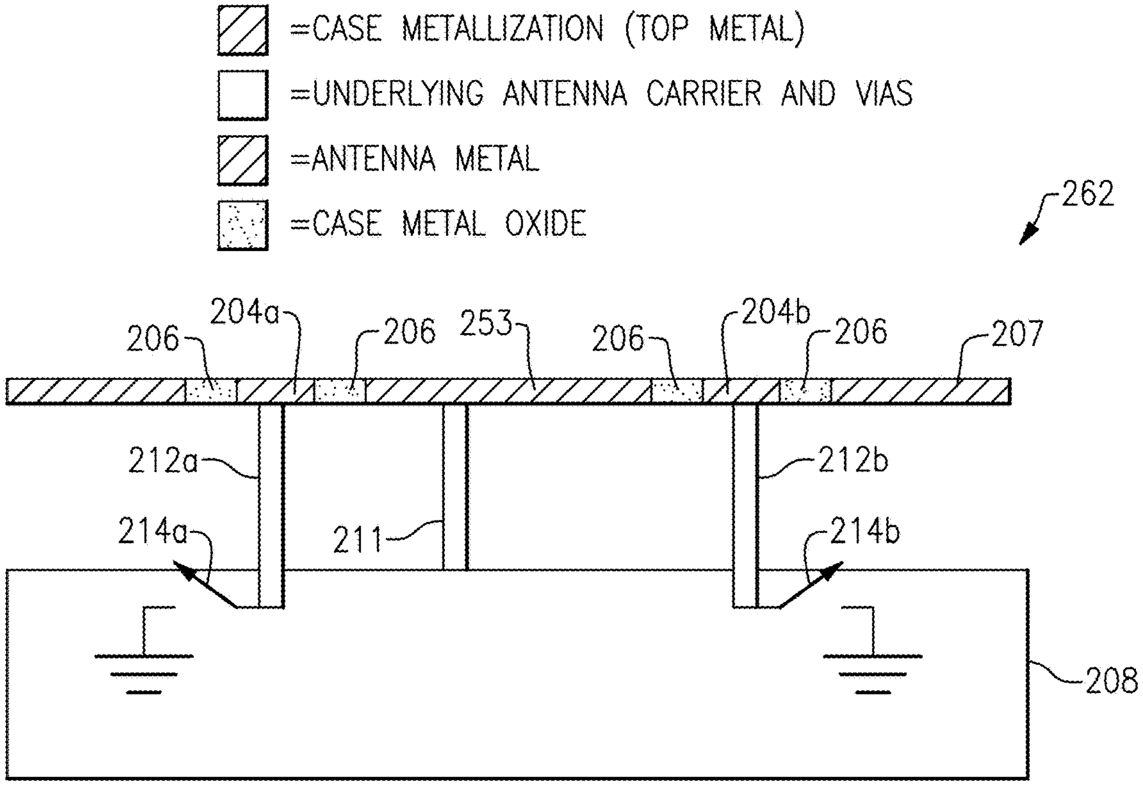
FIG. 9B is a cross section of the UE of FIG. 9A taken along the lines 9B-9B.

FIG. 9A is a plan view of another embodiment of UE 270. FIG. 9B is a cross section of the UE 270 of FIG. 9A taken along the lines 9B-9B. The UE 270 includes a metal case 251 and an antenna system 262. The antenna system 262 includes an antenna element 253, tuning conductors 204*a*-204*d*, an antenna carrier 208, a signal feed 211, tuning conductor feeds 212*a*-212*b*, and switches 214*a*-214*b*.

The UE 270 of FIGS. 9A and 9B is similar to the UE 260 of FIGS. 8A and 8B, except that the UE 270 further includes switches for controlling the voltages of tuning conductors. For example, as shown in FIG. 9B, the first switch 214*a* is included between the first tuning conductor feed 212*a* and ground, and the second switch 214*b* is included between the second tuning conductor feed 212*b* and ground.

Figure 10A:
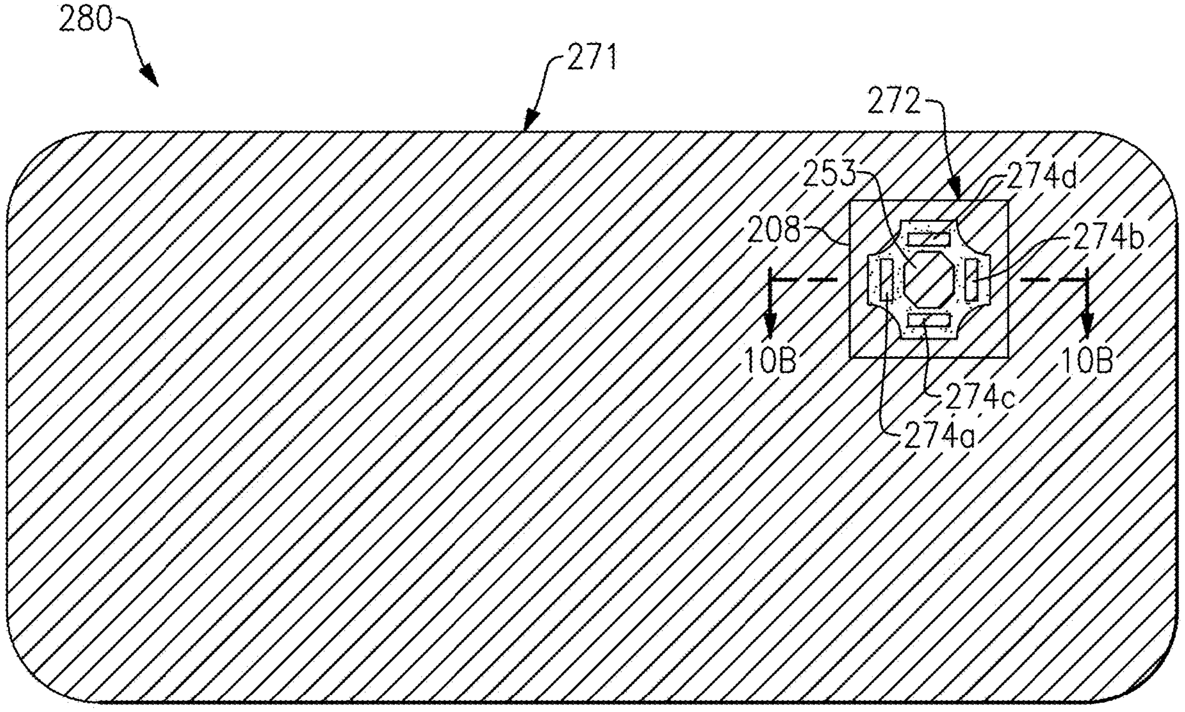
FIG. 10A is a plan view of another embodiment of UE.
Figure 10B:
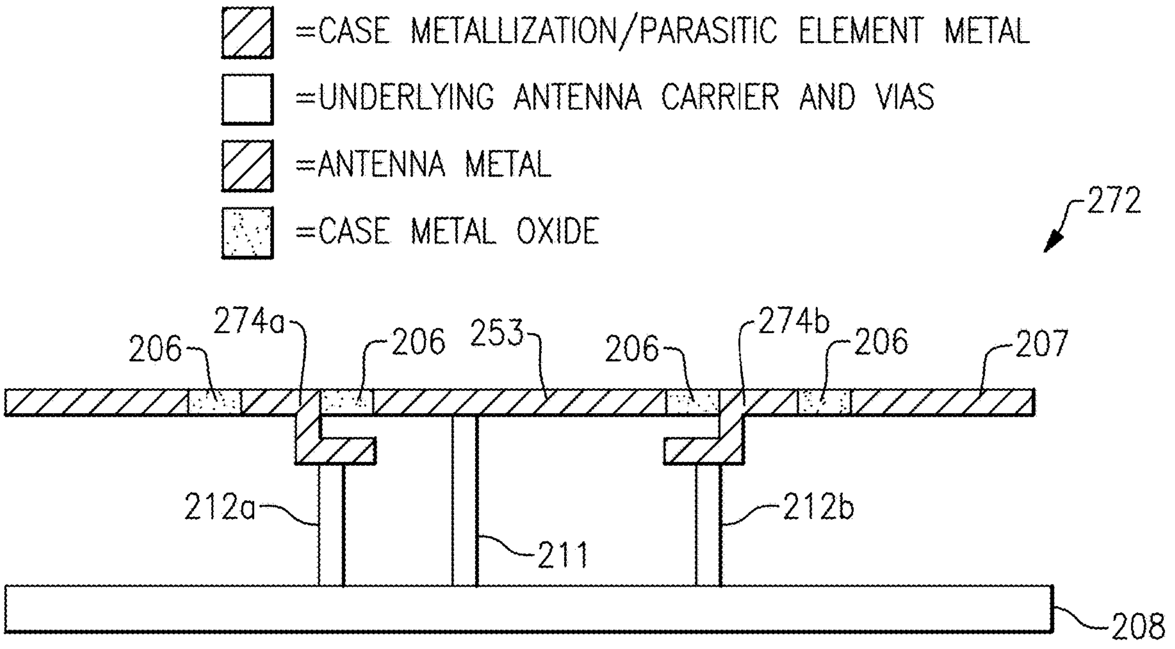
FIG. 10B is a cross section of the UE of FIG. 10A taken along the lines 10B-10B.

FIG. 10A is a plan view of another embodiment of UE 280. FIG. 10B is a cross section of the UE 280 of FIG. 10A taken along the lines 10B-10B. The UE 280 includes a metal case 271 and an antenna system 272. The antenna system 272 includes an antenna element 253, tuning conductors 274*a*-274*d*, an antenna carrier 208, a signal feed 211, and tuning conductor feeds 212*a*-212*b*.

The UE 280 of FIGS. 10A and 10B is similar to the UE 270 of FIGS. 9A and 9B, except that the UE 280 includes a different implementation of tuning conductors. For example, as shown in FIG. 10B, the first tuning conductor 274*a* includes a first portion that is substantially coplanar with the antenna element 253 and a second portion that is closer to (for instance, underlying) the antenna element 253. Likewise, the second tuning conductor 274*b* includes a first portion that is substantially coplanar with the antenna element 253 and a second portion that is closer to the antenna element 253. In certain implementations, the first portion of each tuning conductor is formed from the metal case 271.

By selecting the shape, orientation, and/or number of tuning conductors, different tuning characteristics of the antenna element 253 can be achieved.

Figure 11A:
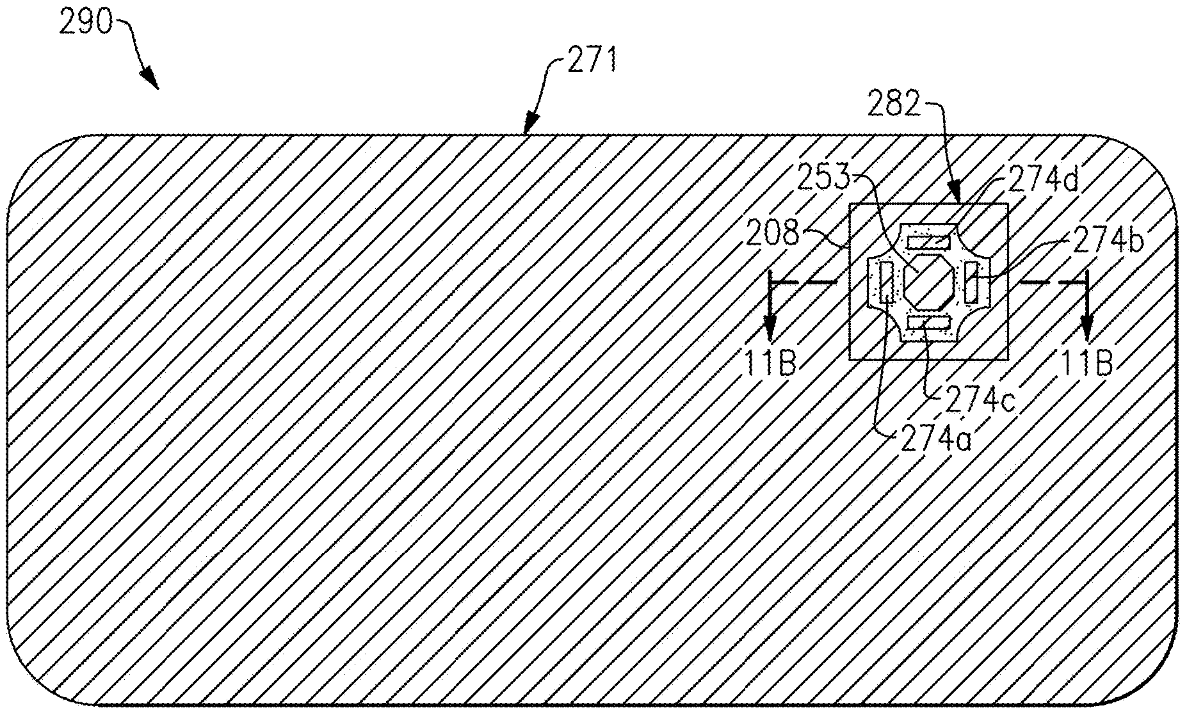
FIG. 11A is a plan view of another embodiment of UE.
Figure 11B:
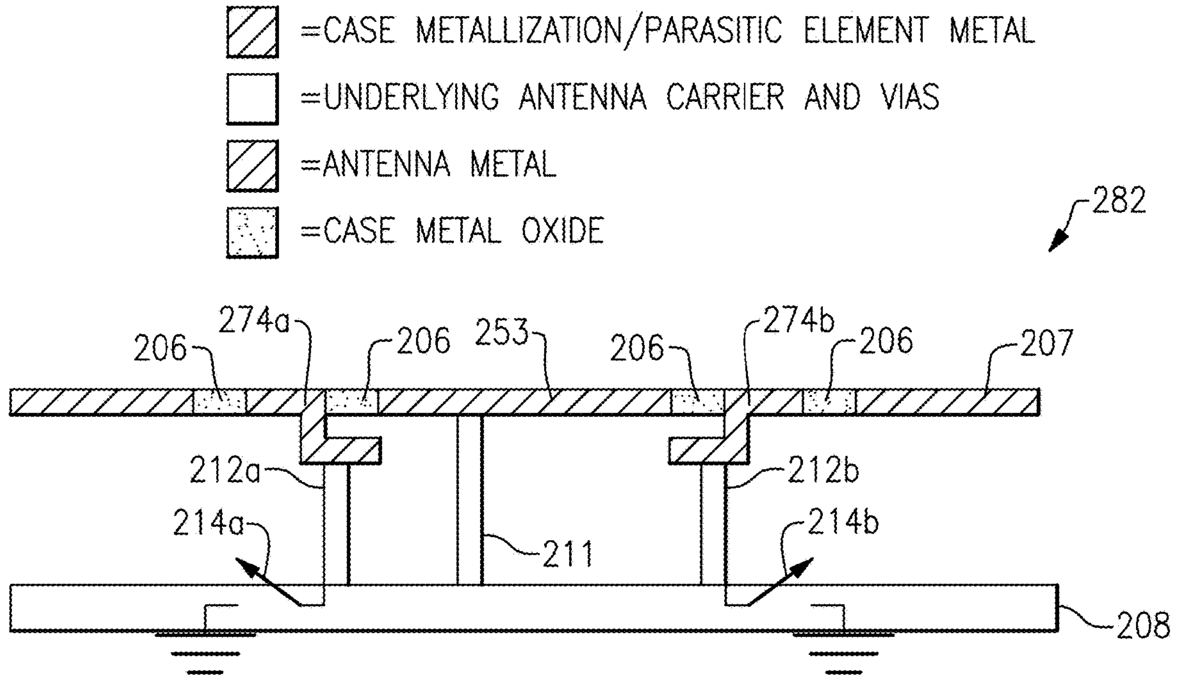
FIG. 11B is a cross section of the UE of FIG. 11A taken along the lines 11B-11B.

FIG. 11A is a plan view of another embodiment of UE 290. FIG. 11B is a cross section of the UE 290 of FIG. 11A taken along the lines 11B-11B. The UE 290 includes a metal case 271 and an antenna system 282. The antenna system 282 includes an antenna element 253, tuning conductors 274*a*-274*d*, an antenna carrier 208, a signal feed 211, tuning conductor feeds 212*a*-212*b*, and switches 214*a*-214*b*.

The UE 290 of FIGS. 11A and 11B is similar to the UE 280 of FIGS. 10A and 10B, except that the UE 290 further includes switches for controlling the voltages of tuning conductors. For example, as shown in FIG. 11B, the first switch 214*a* is included between the first tuning conductor feed 212*a* and ground, and the second switch 214*b* is included between the second tuning conductor feed 212*b* and ground.

Figure 12A:
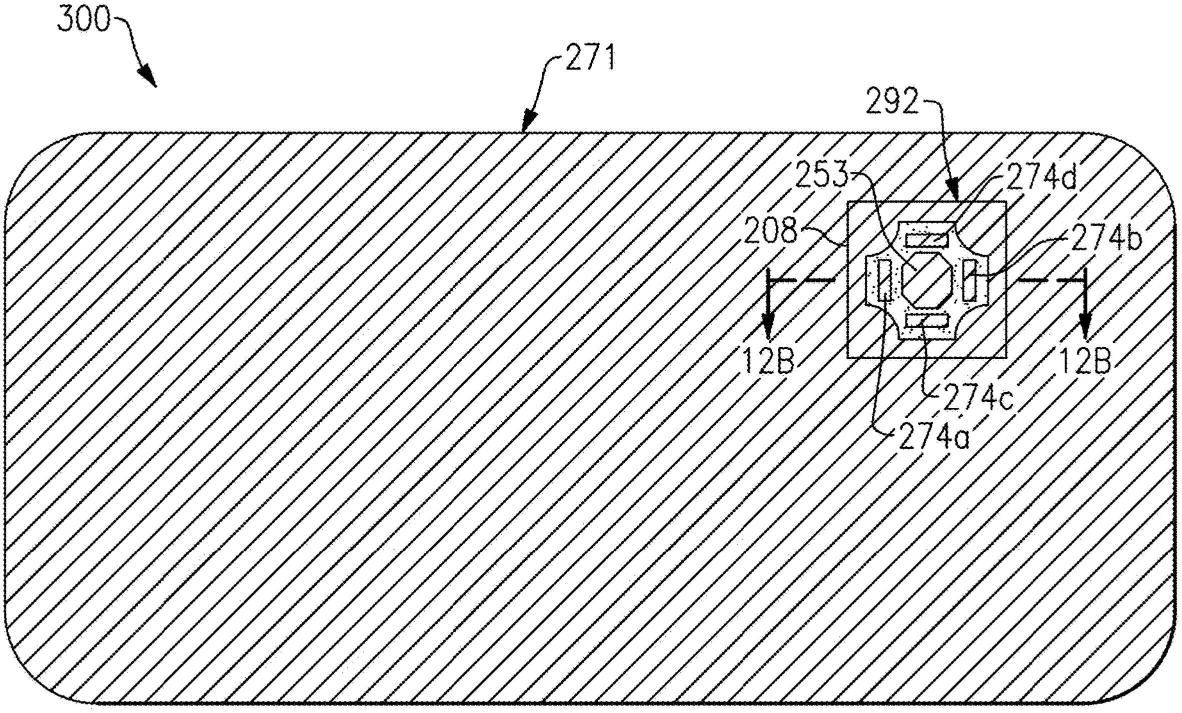
FIG. 12A is a plan view of another embodiment of UE.
Figure 12B:
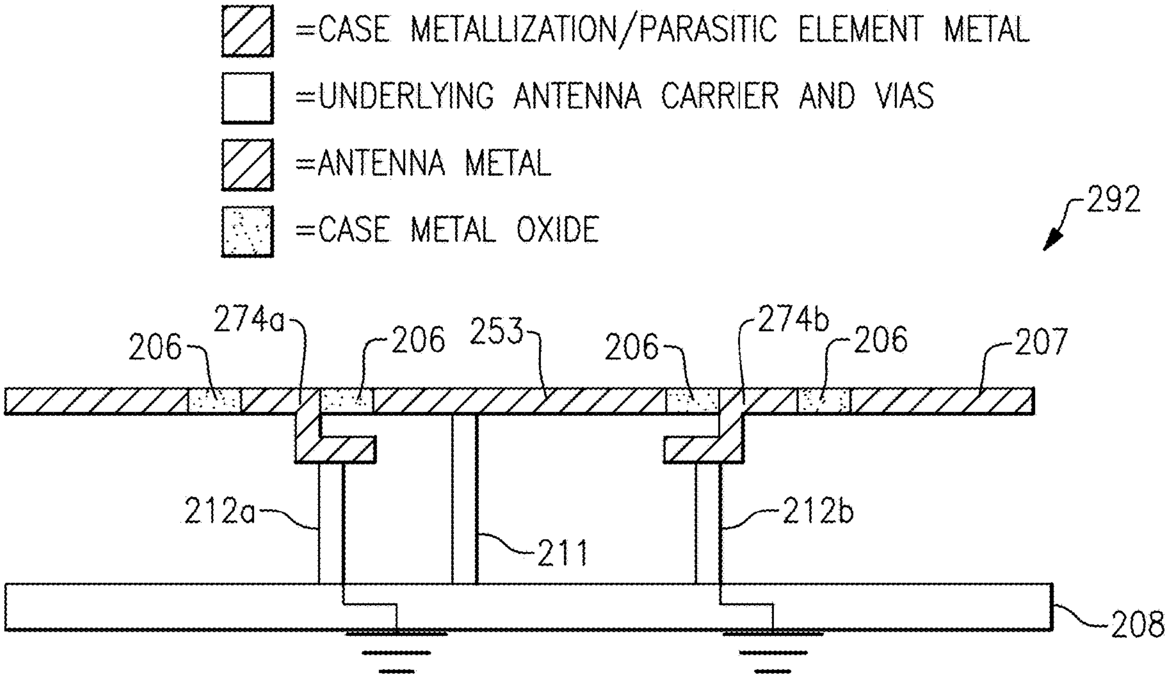
FIG. 12B is a cross section of the UE of FIG. 12A taken along the lines 12B-12B.

FIG. 12A is a plan view of another embodiment of UE 300. FIG. 12B is a cross section of the UE 300 of FIG. 12A taken along the lines 12B-12B. The UE 290 includes a metal case 271 and an antenna system 292. The antenna system 292 includes an antenna element 253, tuning conductors 274*a*-274*d*, an antenna carrier 208, a signal feed 211, tuning conductor feeds 212*a*-212*b*, and switches 214*a*-214*b*.

The UE 300 of FIGS. 12A and 12B is similar to the UE 280 of FIGS. 10A and 10B, except that the UE 300 illustrates an implementation in which the tuning conductors are grounded. For example, as shown in FIG. 12B, the first tuning conductor feed 212*a* grounds the first tuning conductor 274*a*, while the second tuning conductor feed 212*b* grounds the second tuning conductor 274*b*.

Figure 13A:
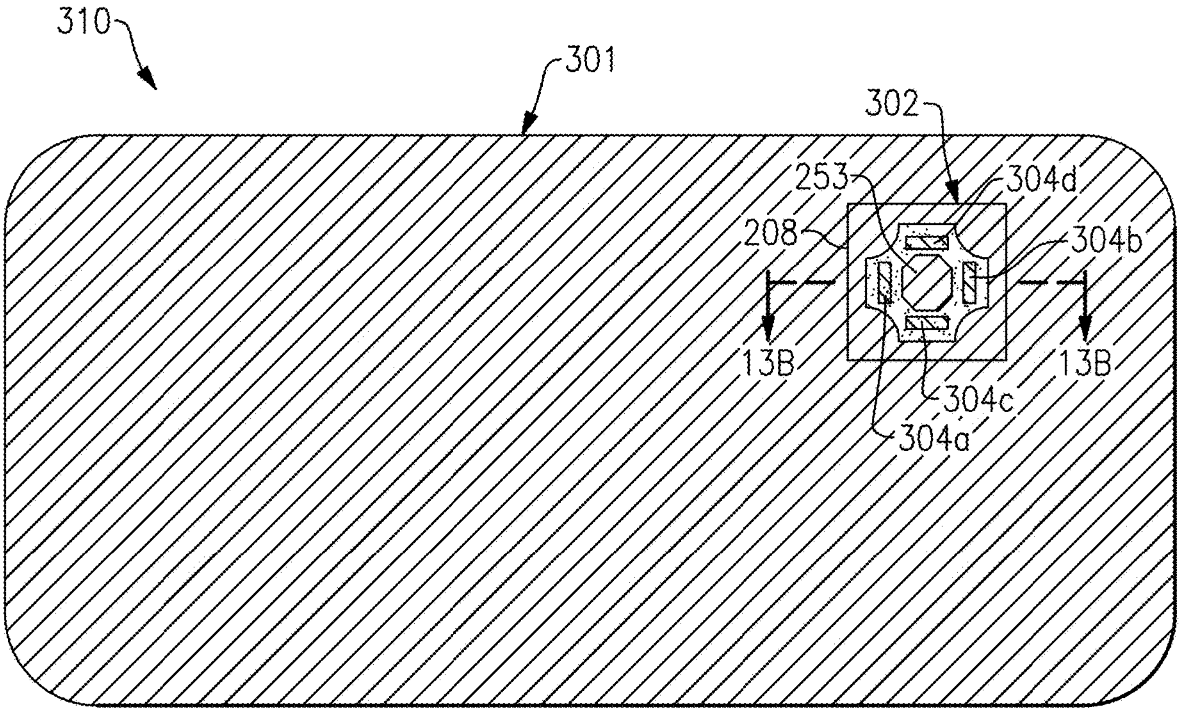
FIG. 13A is a plan view of another embodiment of UE.
Figure 13B:
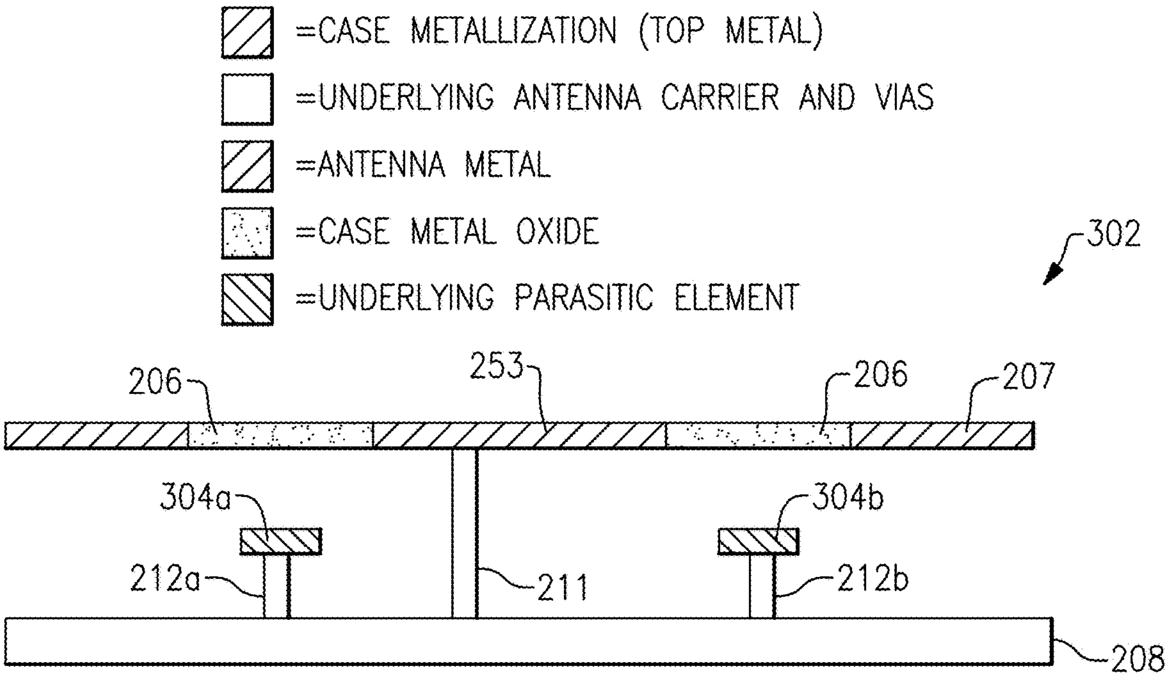
FIG. 13B is a cross section of the UE of FIG. 13A taken along the lines 13B-13B.

FIG. 13A is a plan view of another embodiment of UE 310. FIG. 13B is a cross section of the UE 310 of FIG. 13A taken along the lines 13B-13B. The UE 310 includes a metal case 301 and an antenna system 302. The antenna system 302 includes an antenna element 253, tuning conductors 304*a*-304*d*, an antenna carrier 208, a signal feed 211, and tuning conductor feeds 212*a*-212*b*.

The UE 310 of FIGS. 13A and 13B is similar to the UE 260 of FIGS. 8A and 8B, except that the UE 310 illustrates an implementation in which the tuning conductors underlie a metal case. For example, as shown in FIG. 13B, the first tuning conductor 304*a* is beneath the metal case 301. In particular, the first tuning conductor 304 is vertically offset from the antenna element 253 and the region 207 of the metal case 301 surrounding the antenna system 302. Likewise, the second tuning conductor 304*b* is beneath the metal case.

Figure 14A:
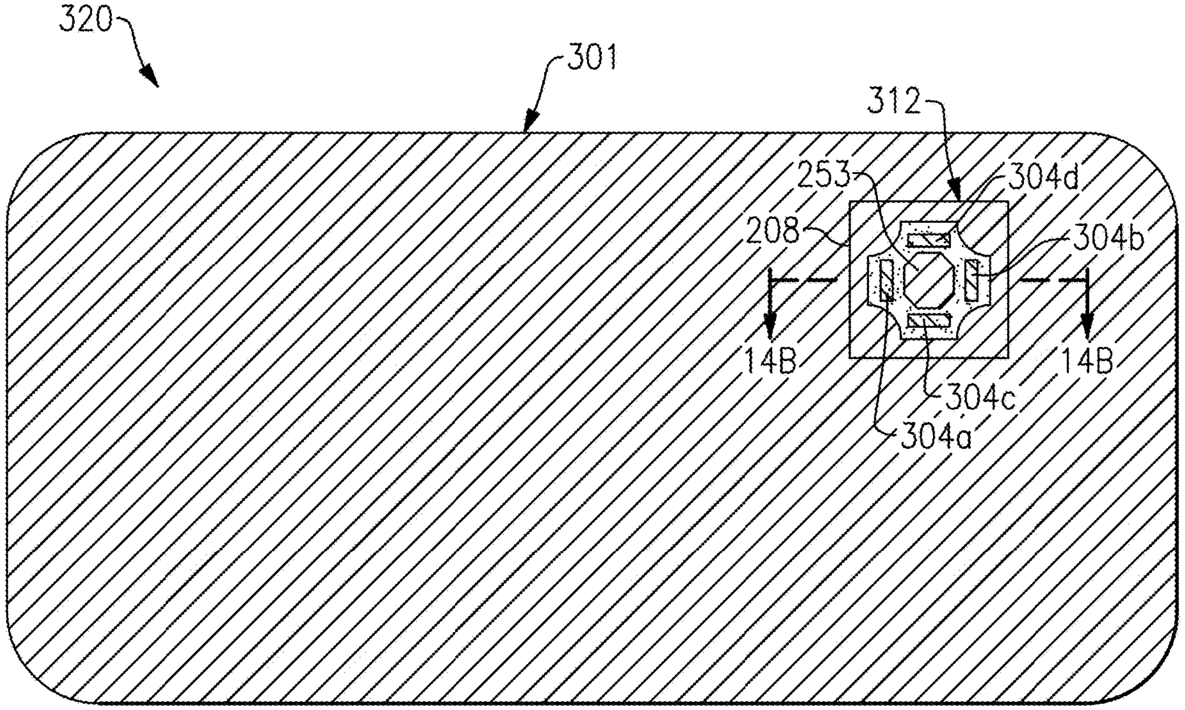
FIG. 14A is a plan view of another embodiment of UE.
Figure 14B:
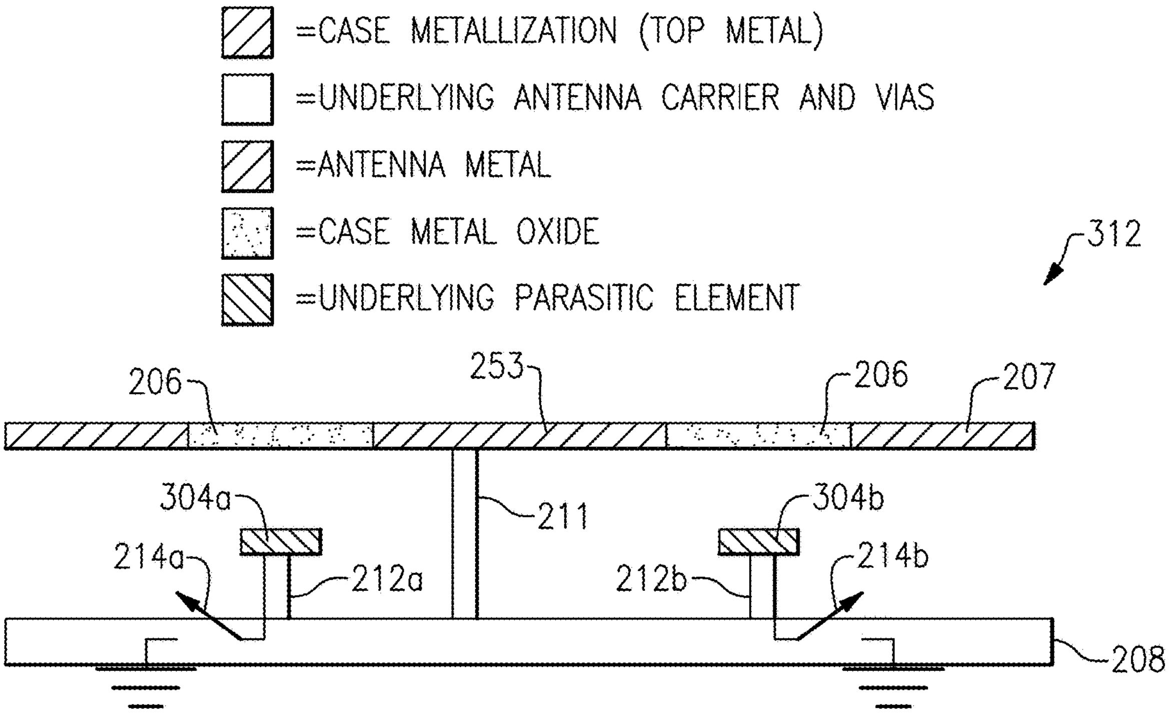
FIG. 14B is a cross section of the UE of FIG. 14A taken along the lines 14B-14B.

FIG. 14A is a plan view of another embodiment of UE 320. FIG. 14B is a cross section of the UE 320 of FIG. 14A taken along the lines 14B-14B. The UE 320 includes a metal case 301 and an antenna system 312. The antenna system 312 includes an antenna element 253, tuning conductors 304*a*-304*d*, an antenna carrier 208, a signal feed 211, tuning conductor feeds 212*a*-212*b*, and switches 214*a*-214*b*.

The UE 320 of FIGS. 14A and 14B is similar to the UE 310 of FIGS. 13A and 13B, except that the UE 320 further includes switches for controlling the voltages of tuning conductors. For example, as shown in FIG. 14B, the first switch 214*a* is included between the first tuning conductor feed 212*a* and ground, and the second switch 214*b* is included between the second tuning conductor feed 212*b* and ground.

Figure 15A:
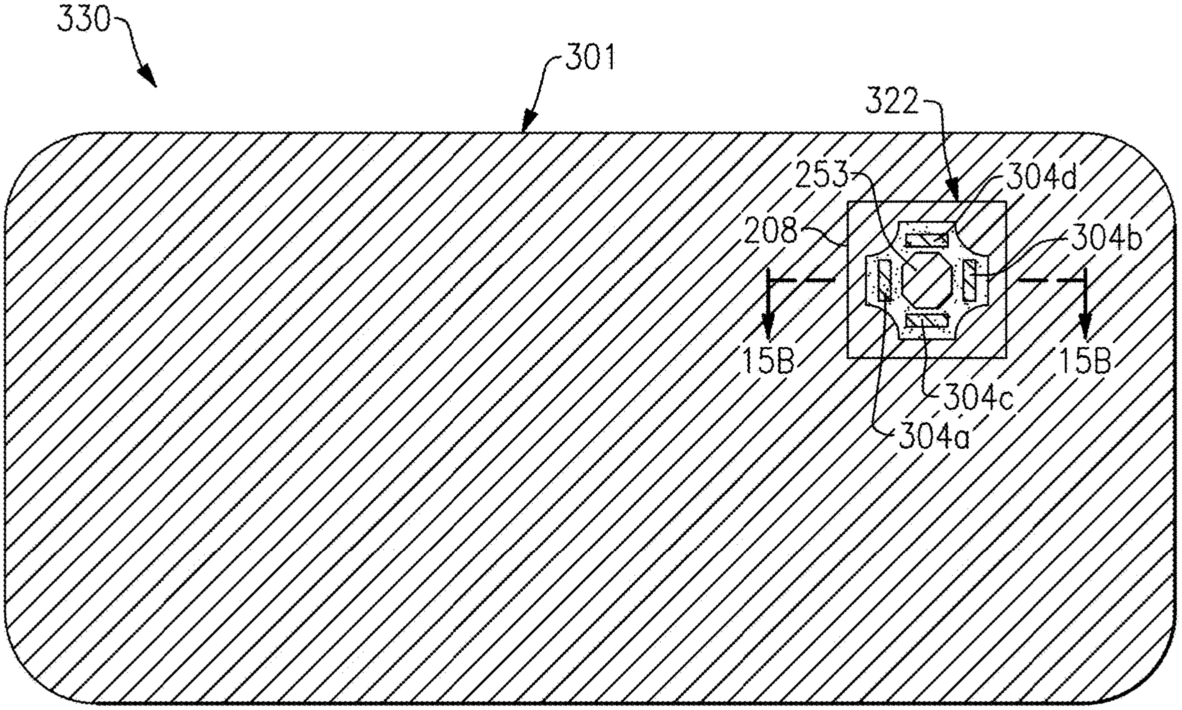
FIG. 15A is a plan view of another embodiment of UE.
Figure 15B:
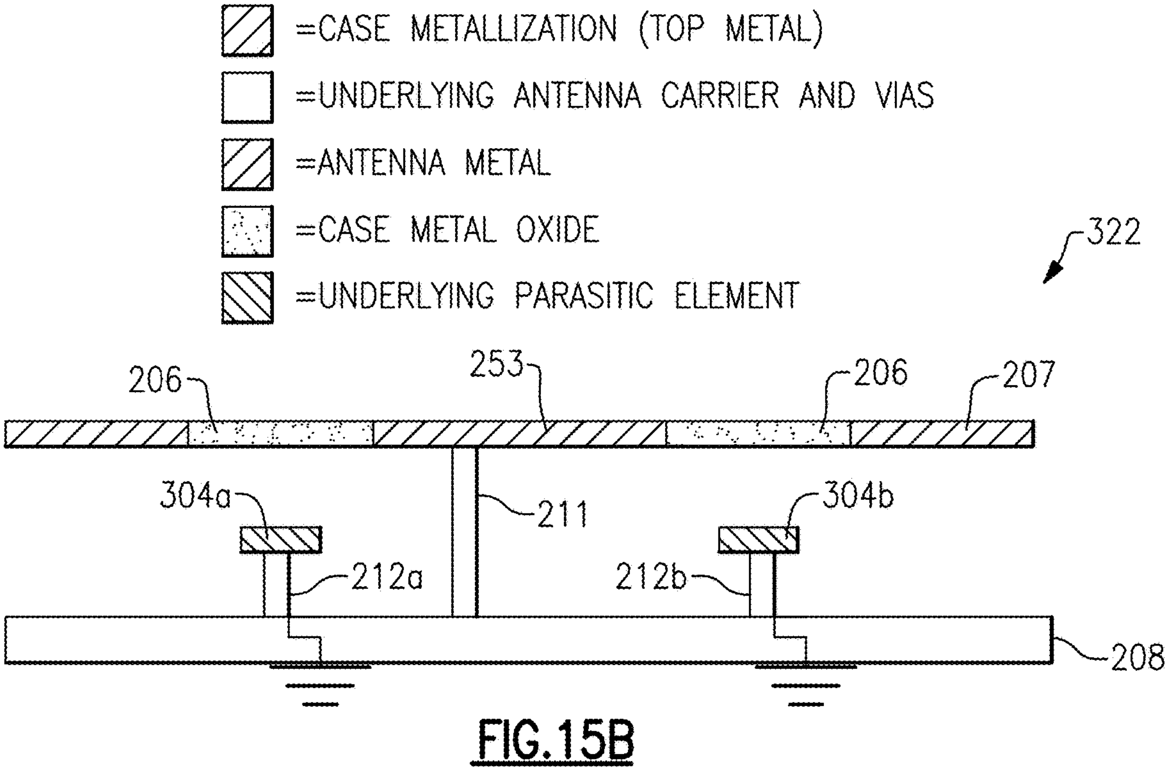
FIG. 15B is a cross section of the UE of FIG. 15A taken along the lines 15B-15B.

FIG. 15A is a plan view of another embodiment of UE 330. FIG. 15B is a cross section of the UE 330 of FIG. 15A taken along the lines 15B-15B. The UE 330 includes a metal case 301 and an antenna system 322. The antenna system 322 includes an antenna element 253, tuning conductors 304*a*-304*d*, an antenna carrier 208, a signal feed 211, and tuning conductor feeds 212*a*-212*b*.

The UE 330 of FIGS. 15A and 15B is similar to the UE 310 of FIGS. 13A and 13B, except that the UE 330 illustrates an implementation in which the tuning conductors are grounded. For example, as shown in FIG. 15B, the first tuning conductor feed 212*a* grounds the first tuning conductor 304*a*, while the second tuning conductor feed 212*b* grounds the second tuning conductor 304*b*.

Figure 16:
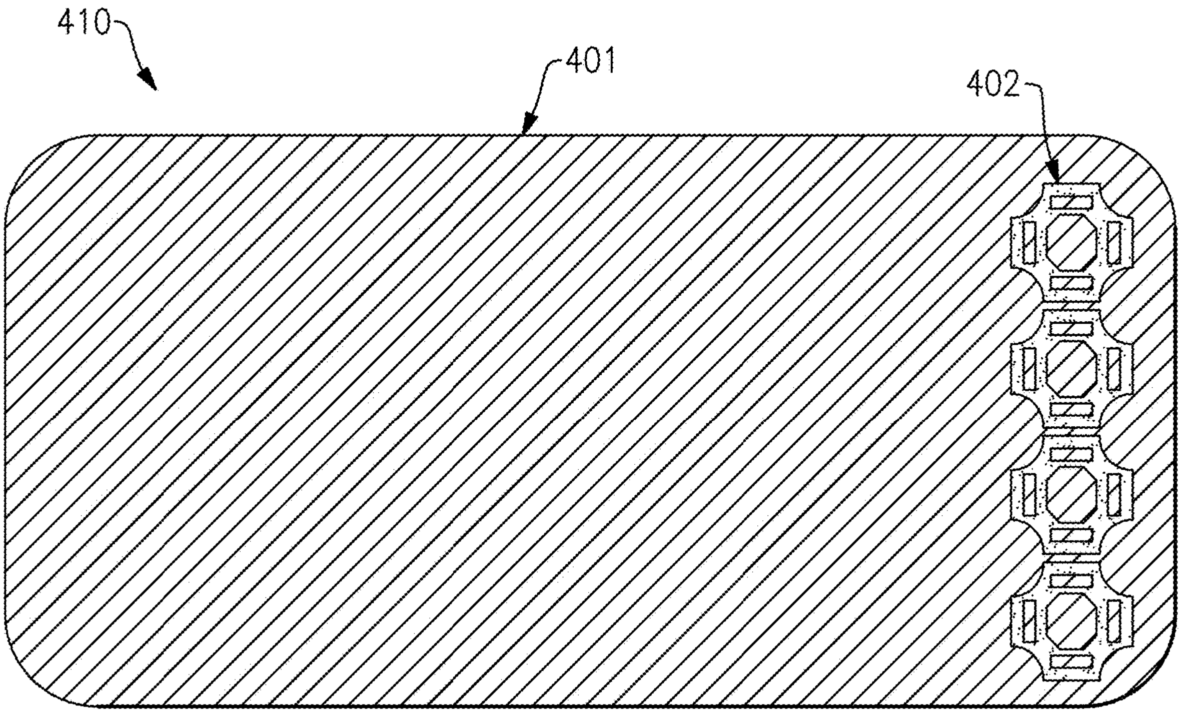
FIG. 16 is a plan view of another embodiment of UE.

FIG. 16 is a plan view of another embodiment of UE 410. The UE 410 includes a metal case 401 and an antenna system 402 including four antenna elements each with four tuning conductors.

Although an example with four antenna elements is shown, the antenna system 402 can include more or fewer antenna elements. Furthermore, although each antenna element is shown as including four tuning conductors, the antenna elements can include more or fewer tuning conductors.

Any of the antenna systems herein can be implemented with multiple antenna elements. Including multiple antenna elements in an antenna system can provide a number of advantages, including, but not limited to, support for MIMO and/or beamforming communications.

Figure 17:
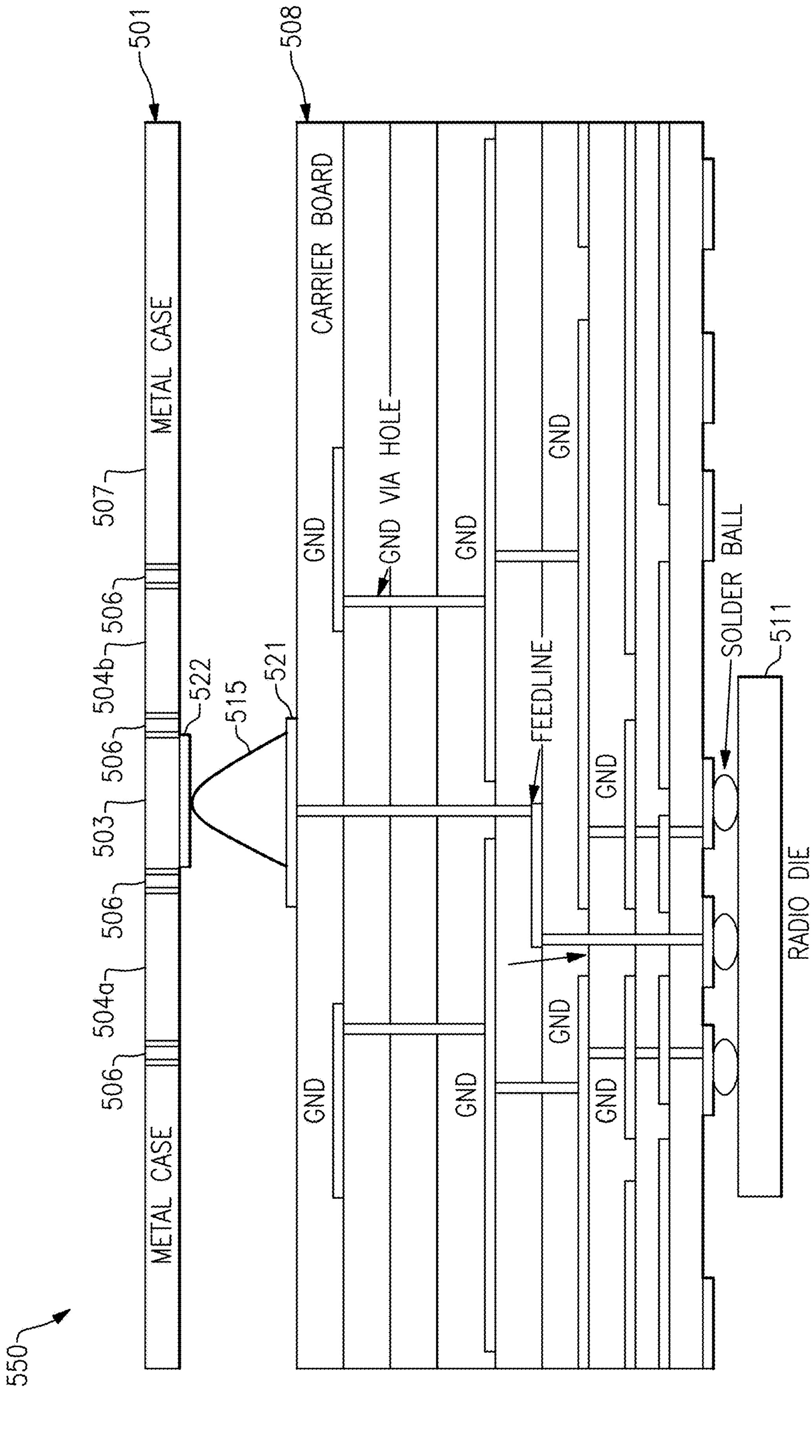
FIG. 17 is a cross section of another embodiment of UE.

FIG. 17 is a cross section of another embodiment of UE 550. The cross section depicts a metal case 501 and a carrier board 508.

As shown in FIG. 17, the metal case 501 has been processed using plasma to selectively form non-conductive metal oxide regions 506 that electrically insulate regions of the metal case 501 from one another. For example, the metal case 501 has been processed to form an antenna element 503, a first tuning conductor 504*a*, a second tuning conductor 504*b* and a region 507 surrounding the antenna element 503 and tuning conductors 504*a*-504*b*.

In the illustrated embodiment, the carrier board 508 is a multi-layer laminate including alternating conductive and non-conductive layers. Additionally, vias are formed through the carrier board 508 to provide desired electrical connectivity. A semiconductor die 511 is attached to a side of the carrier board 508 opposite the metal case 501. The semiconductor die 511 can include a wide variety of circuitry, such as switches for controlling the voltages of the tuning conductors 504*a*-504*b*, a power amplifier for providing an RF transmit signal to the antenna element 503, and/or a low noise amplifier for amplifying an RF signal received from the antenna element 503. In certain implementations, the semiconductor die 511 include at least a portion of an RF front end system.

As shown in FIG. 17, an antenna contact 515 is provided between a conductive pad 521 of the carrier board 508 and a conductive pad 522 attached to a backside of the antenna element 503.

Figure 18:
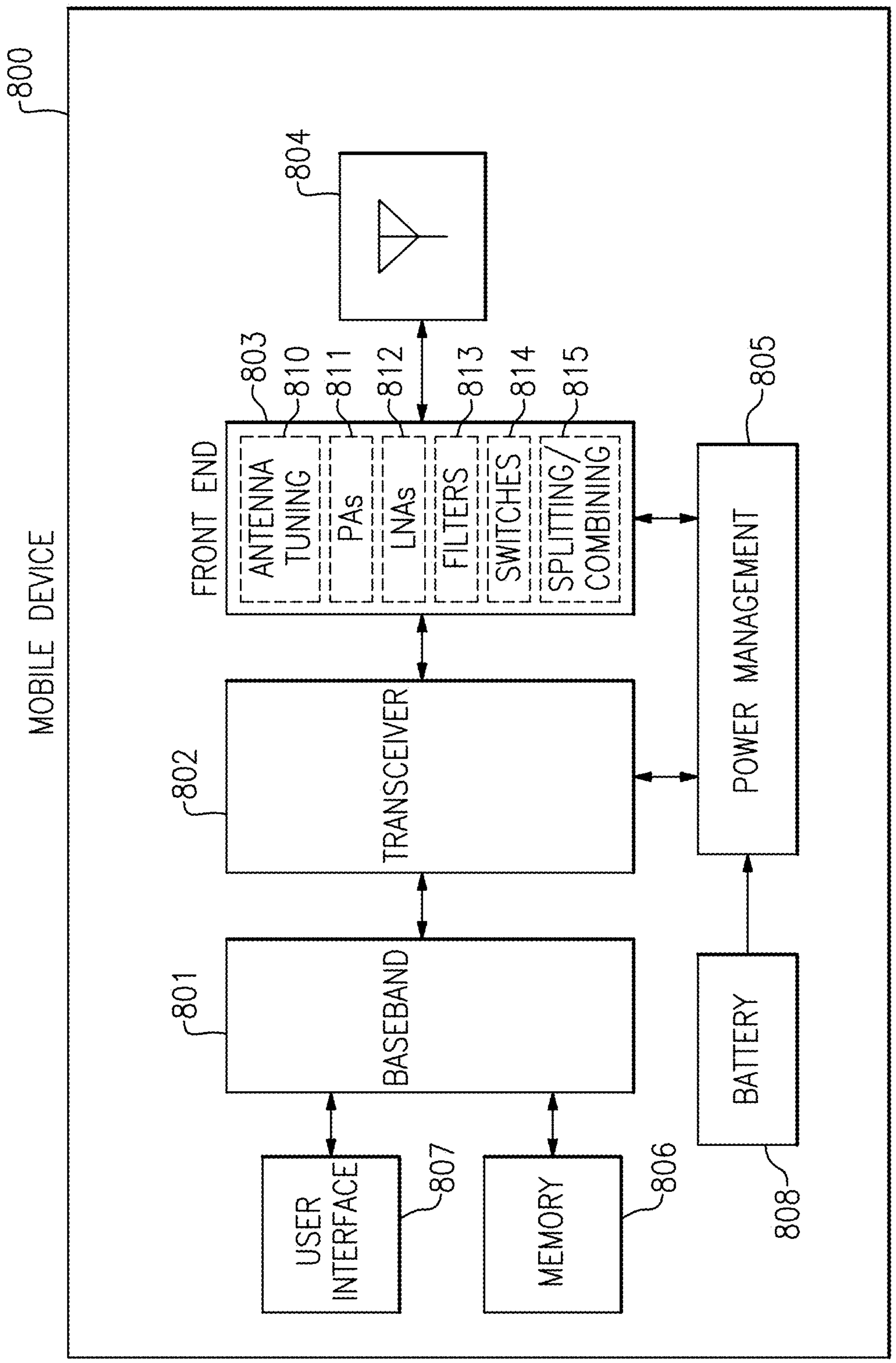
FIG. 18 is a schematic diagram of one embodiment of a mobile device.

FIG. 18 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 18 as the transceiver 802. In one example, separate components (for instance, separate circuits or dies) can be provided for handling certain types of RF signals.

The front end system 803 aids is conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 18, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 18, the power management system 805 receives a battery voltage from the battery 808. The battery 808 can be any suitable battery for use in the mobile device 800, including, for example, a lithium-ion battery.

CONCLUSION

Some of the embodiments described above have provided examples of dynamic beam control in connection with wireless communication devices. However, the principles and advantages of the embodiments can be used for any other systems or apparatus that benefit from any of the circuits and systems described herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile phone comprising:

electronic circuitry;

a metal case housing the electronic circuitry and forming a portion of an exterior surface of the mobile phone; and an antenna system including a patch antenna element formed in the metal case and surrounded by a metal oxide region, a first tuning conductor operable to load the patch antenna element, and a first switch electrically connected in series between the first tuning conductor and a ground voltage, at least a portion of the first tuning conductor underlying the patch antenna element.

2. The mobile phone of claim 1 wherein the first tuning conductor includes a first portion underlying the patch antenna element and a second portion formed in the in the metal case and surrounded by the metal oxide region.

3. The mobile phone of claim 1 wherein the first switch is operable to connect the first tuning conductor to the ground voltage in an on state and to disconnect the first tuning conductor from the ground voltage in an off state.

4. The mobile phone of claim 1 wherein the antenna system further includes a second tuning conductor operable to load the patch antenna element, the first tuning conductor and second tuning conductor positioned on opposite sides of the patch antenna element.

5. The mobile phone of claim 4 wherein the antenna system further includes a third tuning conductor and a fourth tuning conductor each operable to load the patch antenna element, the first tuning conductor, the second tuning conductor, the third tuning conductor, and the fourth tuning conductor each positioned along a different side of the patch antenna element.

6. The mobile phone of claim 4 wherein the antenna system further includes a second switch electrically connected in series between the second tuning conductor and the ground voltage.

7. The mobile phone of claim 1 wherein a state of the first switch is operable to tune a bandwidth of the patch antenna element.

8. The mobile phone of claim 1 further comprising an antenna carrier supporting the patch antenna element.

9. The mobile phone of claim 1 wherein the antenna system includes an array of antenna elements including the patch antenna element, the array of antenna elements formed in the metal case.

10. The mobile phone of claim 9 wherein the electronic circuitry is configured to use the array for beamforming communications.

11. An antenna system for a mobile phone, the antenna system comprising:

a patch antenna element formed in a metal case for the mobile phone;

a metal oxide region surrounding the patch antenna element;

a first tuning conductor operable to load the patch antenna element, at least a portion of the first tuning conductor underlying the patch antenna element; and a first switch electrically connected in series between the first tuning conductor and a ground voltage.

12. The antenna system of claim 11 wherein the first tuning conductor includes a first portion underlying the patch antenna element and a second portion formed in the in the metal case and surrounded by the metal oxide region.

13. The antenna system of claim 11 wherein the first switch is operable to connect the first tuning conductor to the ground voltage in an on state and to disconnect the first tuning conductor from the ground voltage in an off state.

14. The antenna system of claim 11 further comprising a second tuning conductor operable to load the patch antenna element, the first tuning conductor and second tuning conductor positioned on opposite sides of the patch antenna element.

15. The antenna system of claim 14 further comprising a third tuning conductor and a fourth tuning conductor each operable to load the patch antenna element, the first tuning conductor, the second tuning conductor, the third tuning conductor, and the fourth tuning conductor each positioned along a different side of the first patch antenna element.

16. The antenna system of claim 14 further comprising a second switch electrically connected in series between the second tuning conductor and the ground voltage.

17. The antenna system of claim 11 wherein a state of the first switch is operable to tune a bandwidth of the patch antenna element.

18. The antenna system of claim 11 further comprising an antenna carrier supporting the patch antenna element.

19. The antenna system of claim 11 an array of antenna elements including the patch antenna element, the array of antenna elements formed in the metal case.

20. A method of forming an antenna system for a mobile phone, the method comprising:

forming a patch antenna element in a metal case for the mobile phone;

forming a metal oxide region surrounding the patch antenna element;

providing a first tuning conductor operable to load the patch antenna element, at least a portion of the first tuning conductor underlying the patch antenna element; and providing a first switch electrically connected in series between the first tuning conductor and a ground voltage.

* * * * *